US012700746B2

(12) United States Patent
Aw et al.

(10) Patent No.: US 12,700,746 B2
(45) Date of Patent: Aug. 4, 2026

(54) AEROSOL-GENERATING SYSTEM WITH IMPROVED ELECTRICAL CONNECTOR

(71) Applicant: Philip Morris Products S.A., Neuchatel (CH)

(72) Inventors: Sze Chiek Aw, Singapore (SG); Teck Yan Chan, Singapore (SG); Dani Ruscio, Cressier (CH); Yeong Taur Eow, Singapore (SG)

(73) Assignee: Philip Morris Products S.A., Neuchatel (CH)

( * ) Notice: Subject to any disclaimer, the term of this patent is extended or adjusted under 35 U.S.C. 154(b) by 513 days.

(21) Appl. No.: 18/251,914

(22) PCT Filed: Nov. 12, 2021

(86) PCT No.: PCT/EP2021/081602
§ 371 (c)(1),
(2) Date: May 5, 2023

(87) PCT Pub. No.: WO2022/101454
PCT Pub. Date: May 19, 2022

(65) Prior Publication Data
US 2024/0014675 A1 Jan. 11, 2024

(30) Foreign Application Priority Data

Nov. 13, 2020 (EP) .................................... 20207598

(51) Int. Cl.
*A24F 40/95* (2020.01)
*H01R 13/26* (2006.01)
(Continued)

(52) U.S. Cl.
CPC .............. *H02J 7/751* (2026.01); *A24F 40/95* (2020.01); *H01R 13/6205* (2013.01);
(Continued)

(58) Field of Classification Search
CPC .... H02J 7/0045; A24F 40/95; H01R 13/6205; H01R 33/72; H01R 33/74; H01R 13/2471; H01R 13/26
See application file for complete search history.

(56) References Cited

U.S. PATENT DOCUMENTS

2007/0287302 A1 12/2007 Lindberg et al.
2009/0111287 A1 4/2009 Lindberg et al.
(Continued)

FOREIGN PATENT DOCUMENTS

EP 1 865 581 A2 12/2007
EP 1 865 581 B1 4/2012
(Continued)

OTHER PUBLICATIONS

Extended European Search Report issued May 11, 2021 in European Patent Application No. 20207598.2, 13 pages.
(Continued)

*Primary Examiner* — Linda L Gray
(74) *Attorney, Agent, or Firm* — Oblon, McClelland, Maier & Neustadt, L.L.P.

(57) ABSTRACT

An electrically operated aerosol-generating system is provided, including: an aerosol-generating device; a charging unit to receive the device; and first and second connector parts, the device having one of the first and the second connector parts and the charging unit having the other one of the first and the second parts, in which the first part includes a first electrical contact, a second electrical contact circumscribing the first contact, and a third electrical contact circumscribing the second contact, the second part includes a face and a projection arranged centrally in the face, the projection being defined by an end face, and a sidewall extending between the face and the end face of the projection. An electrically operated aerosol-generating device, a charging unit for charging an aerosol-generating device, and (Continued)

an electrical connector for an electrically operated aerosol-generating system, are also provided.

6 Claims, 7 Drawing Sheets

(51) Int. Cl.

| | | |
|---|---|---|
| *H01R 13/62* | (2006.01) | |
| *H01R 33/72* | (2006.01) | |
| *H01R 33/74* | (2006.01) | |
| *H02J 7/70* | (2026.01) | |
| *H01R 13/24* | (2006.01) | |

(52) U.S. Cl.
CPC ............. *H01R 33/72* (2013.01); *H01R 33/74* (2013.01); *H01R 13/2471* (2013.01); *H01R 13/26* (2013.01)

(56) References Cited

U.S. PATENT DOCUMENTS

| | | | |
|---|---|---|---|
| 2017/0258135 A1 | 9/2017 | Yerkic-Husejnovic et al. | |
| 2021/0251302 A1 | 8/2021 | Antonopoulos et al. | |

FOREIGN PATENT DOCUMENTS

| | | | |
|---|---|---|---|
| JP | 2015-504668 | A | 2/2015 |
| JP | 2020-518241 | A | 6/2020 |
| KZ | 32814 | B | 6/2018 |
| RU | 2 603 559 | C2 | 11/2016 |
| WO | WO 2018/202730 | A1 | 11/2018 |
| WO | WO 2019/037883 | A1 | 2/2019 |
| WO | WO 2020/014917 | A1 | 1/2020 |

OTHER PUBLICATIONS

Combined Russian Notice of Allowance and Search Report issued Feb. 5, 2025 in Russian Patent Application No. 2023115190/07 (with English Translation of Category of Cited Documents), 15 pages.

International Search Report and Written Opinion issued Feb. 9, 2022 in PCT/EP2021/081602 filed on Nov. 12, 2021, 12 pages.

Japanese Office Action issued on Dec. 1, 2025 in Japanese Patent Application No. 2023-527288 (with unedited computer-generated English translation), 4 pages.

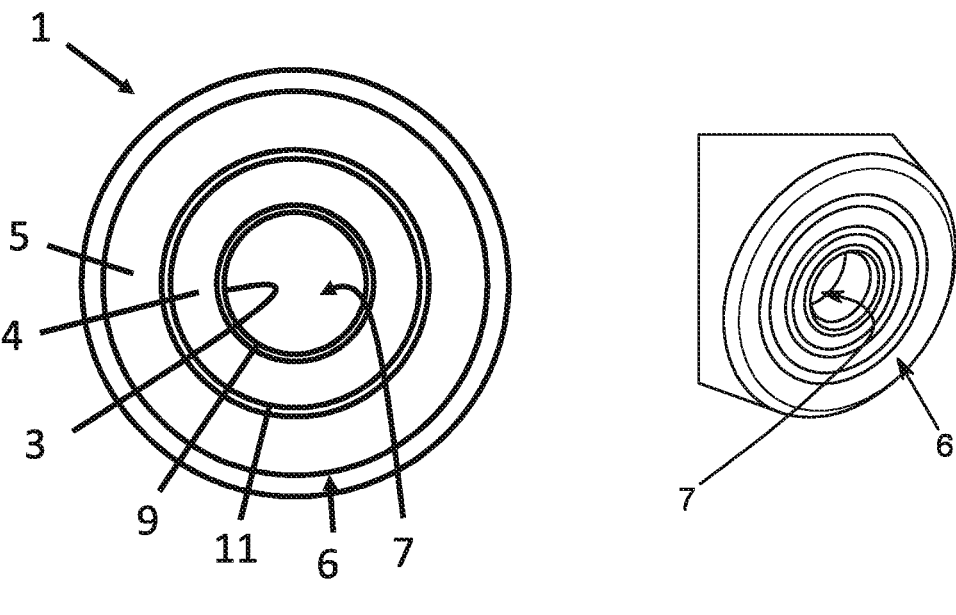
Figure 1                    Figure 2
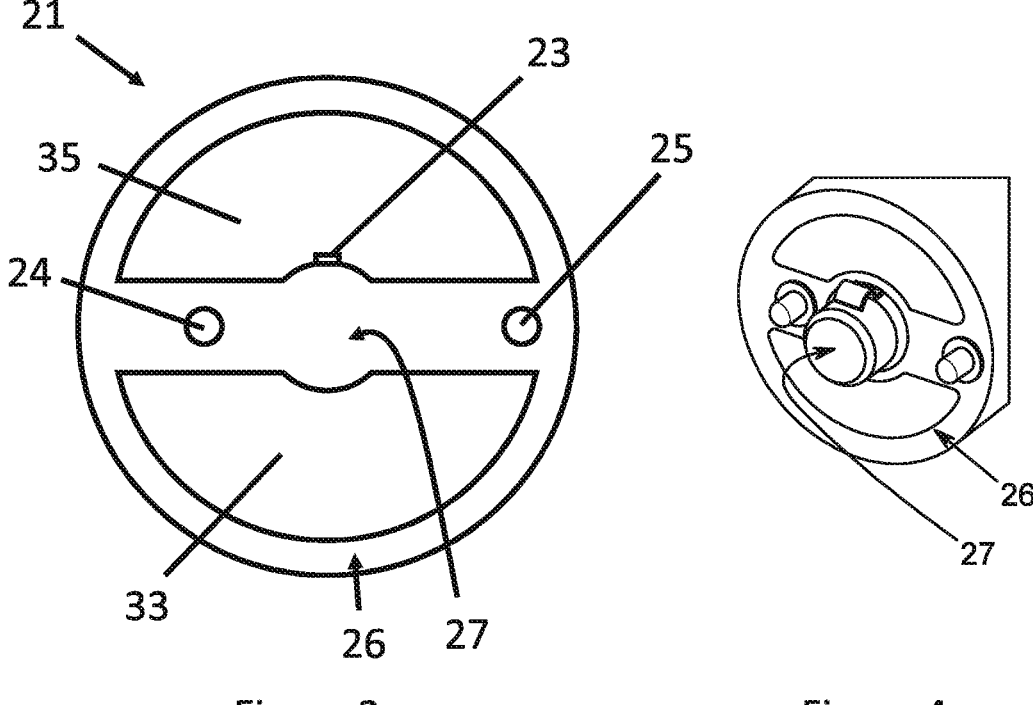
Figure 3                    Figure 4

0.5

1

21

0

1

21

AEROSOL-GENERATING SYSTEM WITH IMPROVED ELECTRICAL CONNECTOR

CROSS-REFERENCE TO RELATED APPLICATIONS

This application is a U.S. national stage application of PCT/EP2021/081602, filed on Nov. 12, 2021, which is based upon and claims the benefit of priority under 35 U.S.C. § 119 from European patent application no. 20207598.2, filed Nov. 13, 2020, the entire contents of each of which are incorporated herein by reference.

TECHNICAL FIELD

The present disclosure relates to electrically operated aerosol-generating systems. In particular, the present disclosure relates to electrically operated aerosol-generating systems comprising an aerosol-generating device and a charging unit. The present disclosure also relates to electrical connectors for electrically operated aerosol-generating systems.

DESCRIPTION OF THE RELATED ART

Electrically operated aerosol-generating systems generally comprise an aerosol-forming substrate and a heater, which is operated to heat the aerosol-forming substrate to form an aerosol for inhalation by a user. Typically, electrically operated aerosol-generating systems also comprise an aerosol-generating device comprising an electrical power supply for supplying power to the heater. The heater may be a resistive electric heater, an induction heater, or the like.

In some systems, the aerosol-generating device is configured to receive an aerosol-generating article comprising a solid aerosol-forming substrate, such as a gathered, crimped sheet of tobacco. In these systems, the device typically comprises the heater, which is arranged to heat the aerosol-forming substrate when the article is received in the device. The article may also comprise a filter, which is wrapped together with the aerosol-forming substrate in the form of a rod, similar to a conventional cigarette. In other systems, the device is configured to receive a cartridge comprising the heater and a liquid aerosol-forming substrate. Such cartridges are often referred to as cartomisers. Common types of heater used in cartomisers comprises a coil of heater wire wound around an elongate wick soaked in liquid aerosol-forming substrate.

Some electrically operated aerosol-generating systems include a charging unit for recharging the electrical power supply of the electrically operated aerosol-generating device. The charging unit may comprise a housing, a rechargeable electrical power supply housed in the housing and a cavity for receiving the electrically operated aerosol-generating device. Typically, charging units are portable and may be carried with the device by a user for extending the operating time of the device.

It would be desirable to improve the speed and ease with which a user is able to electrically connect an aerosol-generating device and a charging unit. It would also be desirable to provide an electrical connector for an electrically operated aerosol-generating system that enables electrical connection between an aerosol-generating device and a charging unit at any angular position. It would further be desirable to provide an electrical connector for an electrically operated aerosol-generating system that enables electrical connection between an aerosol-generating device and a charging unit where the aerosol-generating device is not fully aligned with the charging unit.

SUMMARY

According to an aspect of the disclosure, there is provided an electrically operated aerosol-generating system comprising an aerosol-generating device, a charging unit configured to receive the aerosol-generating device and a first connector part and a second connector part.

The aerosol-generating device may have one of the first connector part and the second connector part, and the charging unit has the other one of the first connector part and the second connector part. The first connector part may comprise: a first electrical contact; a second electrical contact substantially circumscribing the first electrical contact; and a third electrical contact substantially circumscribing the second electrical contact. The second connector part may comprise: a face and a projection arranged substantially centrally in the face; a first electrical contact arranged on the projection; a second electrical contact arranged at the face, spaced radially outwardly from the first electrical contact; and a third electrical contact arranged at the face, spaced radially outwardly from the second electrical contact. The first and second connector parts may be arranged such that when the aerosol-generating device is received by the charging unit the first and second connector parts electrically engage. The electrical contacts of the first and second connector parts may be arranged such that when the first and second connector parts electrically engage: the first electrical contact of the first connector part electrically engages the first electrical contact of the second connector part; the second electrical contact of the first connector part electrically engages one of the second electrical contact and the third electrical contact of the second connector part; and the third electrical contact of the first connector part electrically engages the other one of the second electrical contact and the third electrical contact of the second connector part, regardless of the angular position of the second connector part relative to the first connector part.

BRIEF DESCRIPTION OF THE DRAWINGS

Examples will now be further described with reference to the figures in which:

FIG. 1 shows a schematic illustration of a first connector part of an electrical connector according to an embodiment of the disclosure;

FIG. 2 shows a perspective view of the first connector part of FIG. 1;

FIG. 3 shows a schematic illustration of a second connector part of an electrical connector according to an embodiment of the disclosure, the second connector part being electrically connectable to the first connector part of FIG. 1;

FIG. 4 shows a perspective view of the second connector part of FIG. 3;

DETAILED DESCRIPTION

Figure 5:
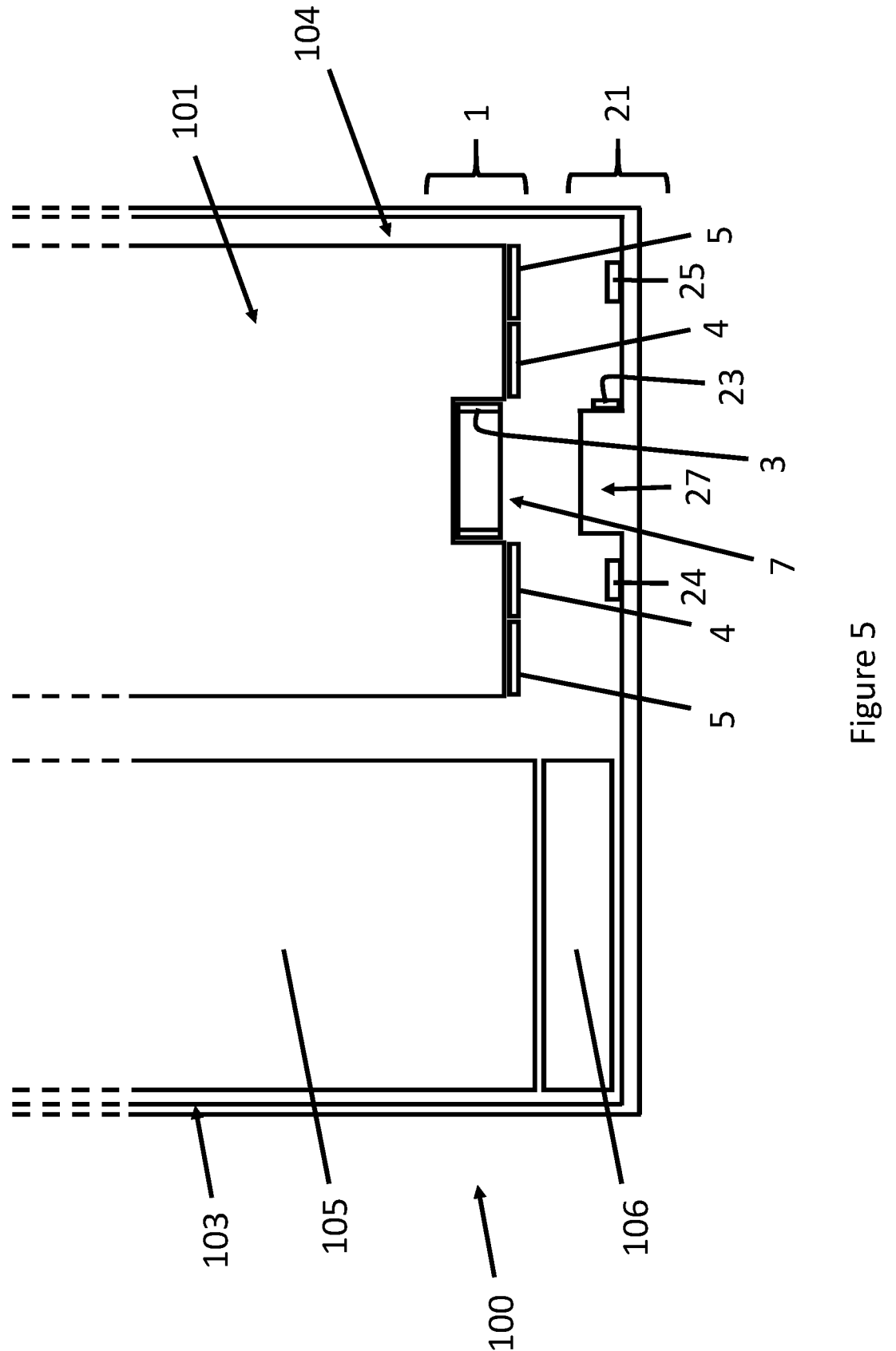
FIG. 5 shows a schematic illustration of an electrically operated aerosol-generating system comprising an electrical connector according to an embodiment of the disclosure, the system comprising an aerosol-generating device received in a charging unit, the aerosol-generating device including the first connector part of FIGS. 1 and 2, and the charging unit comprising the second connector part of FIGS. 3 and 4.

The first and second connector parts of the present disclosure enable electrical connection between an aerosol-generating device and a charging unit regardless of the angular position of the device relative to the charging unit. Advantageously, this may improve the speed and ease with which a user is able to electrically connect an aerosol-generating device and a charging unit. For example, this may enable a user to electrically connect a device and a charging unit when the device and charging unit are unsighted, such as in the dark or when the user's attention is focussed elsewhere.

In preferred embodiments, the projection of the second connector part is defined by an end face, and at least one sidewall extending between the face and the end face of the projection. Particularly preferably, the first electrical contact of the second connector part is arranged at the at least one sidewall of the projection.

No electrical contacts are arranged at the end face of the projection of the second connector part. In other words, the end face of the projection of the second connector part does not comprise an electrical contact. More particularly, there is no electrical contact arranged at the centre of the end face of the projection of the connector part. The only electrical contact, or electrical contacts, arranged on the projection are arranged at the at least one sidewall of the projection. Advantageously, this may provide a robust electrical connector that is able to be connected and disconnected a large number of times without damaging the electrical contacts of either connector part.

Undesired contact between the end face of the projection of the second connector part and the first connector part may occur during connection and disconnection of the connector parts due to misalignment of the first and second connector parts. For example, where the charging unit has a cavity for receiving an aerosol-generating article, and the cavity has a longitudinal axis, a connector part of an aerosol-generating device received in the cavity may be misaligned with the connector part of the charging unit if the aerosol-generating device is not aligned with the longitudinal axis of the cavity. Such misalignment of the aerosol-generating device in the cavity may result in the first connector part to undesirably collide with the first contact the end face of the projection of the second connector part. Such undesired contact may lead to damage of the end face of the projection. By not positioning an electrical contact at the end face of the projection of the second connector part, the second connector part is made more resilient to damage during normal use.

In some cases, it may be desirable to provide a charging unit with a cavity for receiving an aerosol-generating device having a diameter or width that is greater than the diameter or width of the aerosol-generating device. Advantageously, providing a charging unit with a cavity for receiving an aerosol-generating device with a diameter or width that is greater than the diameter or width of the aerosol-generating device may facilitate insertion of the aerosol-generating device into the cavity of the charging unit. However, providing a charging unit with a cavity having a large diameter or width compared to the diameter or width of the aerosol-generating device may also increase the risk of misalignment of the first and second connector parts when the aerosol-generating device is inserted into the cavity. Advantageously, providing an aerosol-generating system with an electrical connector according to the present disclosure may enable a charging unit to comprise a cavity with a large diameter for facilitating insertion of the aerosol-generating device into the cavity, without significantly increasing the risk of damaging the first and second connector parts during connection and disconnection.

In some preferred cases, it may be desirable to provide a charging unit with a cavity for receiving an aerosol-generating device that is configured to receive the aerosol-generating device laterally. In other words, the cavity for receiving an aerosol-generating device may have an opening at a side for receiving the aerosol-generating device. In these cases, the cavity of the charging unit may be formed by two closed ends spaced apart in a longitudinal direction, and a sidewall extending between the two closed ends may define the base of the cavity. In these cases, the sidewall and the closed ends define a trough into which an aerosol-generating device can be seated. One side of the cavity may be open so that an aerosol-generating device can be inserted into the cavity by moving the aerosol generating device sideways or laterally into the cavity, in a direction perpendicular to the longitudinal direction. This may facilitate insertion of an aerosol-generating device into the cavity, and facilitate removal of an aerosol-generating device from the cavity. Advantageously, providing an aerosol-generating system having a charging unit with a cavity that is configured to receive the aerosol-generating device laterally with an electrical connector according to the present disclosure may minimise the risk of damaging the first and second connector parts during connection and disconnection of the first and second connector parts due to the lateral movement of the aerosol-generating device into the cavity.

In preferred embodiments, the first connector part comprises a face and a recess arranged substantially centrally in the face. The projection of the second connector part is receivable in the recess of the first connector part. Preferably, the first electrical contact of the first connector part is arranged within the recess. Preferably the second electrical contact of the first connector part is arranged at the face, the second electrical contact being radially spaced from the recess by a first distance. Preferably the third electrical contact of the first connector part is arranged at the face, the third electrical contact being radially spaced from the recess by a second distance greater than the first distance.

Particularly preferably, the recess is defined by a closed end face, an open end at the face, and at least one sidewall extending between the open end and the closed end face. Preferably, the first electrical contact of the first connector part is arranged at the at least one sidewall of the recess.

Preferably, no electrical contacts are arranged at the closed end face of the recess of the first connector part. In other words, the end face of the recess of the first connector part does not comprise an electrical contact. More particularly, there is no electrical contact arranged at the centre of the recess of the first connector part. The only electrical contact, or electrical contacts, arranged within the recess are arranged at the at least one sidewall of the recess.

As used herein, the term 'aerosol-generating device' refers to a device that interacts with an aerosol-forming substrate to generate an aerosol that is directly inhalable into a user's lungs thorough the user's mouth. In certain embodiments, an aerosol-generating device may heat an aerosol-forming substrate to facilitate the release of the volatile compounds. An aerosol-generating device may interact with an aerosol-generating article comprising an aerosol-forming substrate or a cartridge comprising an aerosol-forming substrate. An electrically operated aerosol-generating device may comprise a heater, such as a resistive electric heater, an inductive heater etc., to heat the aerosol-forming substrate to form an aerosol.

As used herein, the term 'aerosol-generating article' refers to an article comprising an aerosol-forming substrate capable of releasing volatile compounds, which can form an aerosol. In certain embodiments, the aerosol-generating article may comprise an aerosol-forming substrate capable of releasing upon heating volatile compounds, which can form an aerosol.

As used herein 'electrical engagement' is used to describe an electrical connection or electrical contact between the first and second connector parts that enables an electric current to flow between the first and second connector parts.

As used herein 'angular position' is used to describe the relative rotational position or orientation of one component relative to another component about an axis.

As used herein, the terms 'upstream', 'downstream', 'proximal' and 'distal' are used to describe the relative positions of components, or portions of components, of aerosol-generating devices, aerosol-generating articles and charging units.

As used herein, the term 'longitudinal' is used to describe the direction between a downstream, proximal or mouth end and the opposed upstream or distal end and the term 'transverse' is used to describe the direction perpendicular to the longitudinal direction.

As used herein, the term 'length' is used to describe the maximum longitudinal dimension between the distal or upstream end and the proximal or downstream end of components, aerosol-generating devices, aerosol-generating articles and charging units.

As used herein, the term 'diameter' is used to describe the maximum transverse dimension of components, aerosol-generating devices, aerosol-generating articles and charging units.

As used herein, the term 'transverse cross-section' is used to describe the cross-section of components, aerosol-generating devices, aerosol-generating articles and charging units in the direction perpendicular to the major axis of the components, aerosol-generating devices, aerosol-generating articles and charging units, respectively.

At least one of the electrical contacts of each of the first and second connector parts may be configured to transfer, convey or supply power from the charging unit to the aerosol-generating device. For example, the first electrical contact of each of the first and second connector parts may be configured to transfer power from the charging unit to the aerosol-generating device. In particular, at least one of the electrical contacts of each of the first and second connector parts may be configured to transfer power from an electrical power supply of the charging unit to a rechargeable electrical power supply of the aerosol-generating device. Preferably, the second electrical contact of each of the first and second connector parts may be configured to transfer power from the charging unit to the aerosol-generating device. At least one of the electrical contacts of each of the first and second connector parts may also be configured as a ground connection. For example, the third electrical contact of each of the first and second connector parts may be configured as a ground connection.

At least one of the electrical contacts of each of the first and second connector parts may be configured to transfer data from at least one of the charging unit to the aerosol-generating device and the aerosol-generating device to the charging unit.

In some embodiments, at least one of the electrical contacts of each of the first and second connector parts may be configured to transfer data from the charging unit to the aerosol-generating device. This may advantageously enable software updates to be transferred from the charging unit to the aerosol-generating device. In some embodiments, at least one of the electrical contacts of each of the first and second connector parts may be configured to transfer data from the aerosol-generating device to the charging unit. This may enable usage data to be transferred from the aerosol-generating device to the charging unit. Usage data may include, for example, one or more of state of charge of the rechargeable electrical power supply of the device, number of uses of the device, number of uses of the heater and aerosol-forming substrate identification information. The third electrical contact of each of the first and second connector parts may be configured to transfer data from the charging unit to the aerosol-generating device. The second electrical contact of each of the first and second connector parts may be configured to transfer data from the charging unit to the aerosol-generating device. Preferably, the first electrical contact of each of the first and second connector parts is configured to transfer data from the charging unit to the aerosol-generating device.

The first and second connector parts of the disclosure may be configured to transfer power from the charging unit to the aerosol-generating device and to transfer data from at least one of the charging unit to the device and the device to the charging unit. Advantageously, this may enable the device to comprise a single electrical connector part only. This may reduce the size and weight of the aerosol-generating device compared to a device having a plurality of electrical connector parts.

Typically, the aerosol-generating device may comprise a rechargeable electrical power supply. The rechargeable electrical power supply may comprise any suitable type of rechargeable electrical power supply, such as batteries or capacitors. The rechargeable electrical power supply may comprise a lithium ion battery. The rechargeable electrical power supply of the aerosol-generating device may have a capacity sufficient for the aerosol-generating device to deliver one or more user experiences. A user experience generally comprises a series of puffs in which a user draws on the aerosol-generating device, the aerosol-generating device generates an aerosol by atomising an aerosol-forming substrate and the user inhales the aerosol generated by the device. The number of puffs constituting a typical user experience may be any suitable number. Typically, the number of puffs may be between two and twenty puffs, may be between four and twelve puffs and may be about six or seven puffs. The rechargeable electrical power supply of the aerosol-generating device may have a capacity sufficient for the aerosol-generating device to deliver any suitable number of user experiences. The rechargeable electrical power supply may have a capacity sufficient for the aerosol-generating device to deliver one, two, three, four, five or six user experiences.

Similarly, the charging unit may comprise an electrical power supply. The electrical power supply of the charging unit may comprise any suitable type of electrical power supply, such as batteries and capacitors. The electrical power supply of the charging unit may comprise a lithium ion battery. The first and second connector parts of the disclosure may enable power to be transferred between the electrical power supply of the charging unit and the rechargeable electrical power supply of the aerosol-generating device for charging the rechargeable electrical power supply of the aerosol-generating device. Advantageously, this may extend the useable life of the aerosol-generating device. The electrical power supply of the charging unit may have a capacity sufficient to provide the aerosol-generating device with enough charge to deliver a plurality of user experiences. The electrical power supply of the charging unit may have a capacity sufficient to provide the aerosol-generating device with enough charge to deliver any suitable number of user experiences, such as between one and twenty user experiences, between five and fifteen user experiences and about 10 user experiences. Advantageously, this may enable a user carrying both the aerosol-generating device and the charging unit to use the aerosol-generating device for an extended period of time, such as over a day or a week, without connection of the aerosol-generating device to an external electrical power supply, such as a mains power supply, for charging the rechargeable electrical power supply of the aerosol-generating device.

Typically, the electrical power supply of the charging unit may be rechargeable. The electrical power supply of the charging unit may have a larger capacity than the rechargeable electrical power supply of the aerosol-generating device. The electrical power supply of the charging unit may be physically larger than the rechargeable electrical power supply of the aerosol-generating device.

In some embodiments, the first electrical contacts of the first and second connector parts may be configured to transfer data between the charging unit and the aerosol-generating device, the second electrical contacts of the first and second connector parts may be configured to transfer power between an electrical power supply of the charging unit and a rechargeable electrical power supply of the aerosol-generating device, and the third electrical contacts of the first and second connector parts may be configured as a ground connection.

The aerosol-generating device may be a handheld device. In other words, the aerosol-generating device may have any size and shape suitable to be held in the hand of a user. The aerosol-generating device may have a size and shape similar to a conventional cigarette or cigar. The aerosol-generating device may be portable. Typically, the charging unit may also be portable. The charging unit may have any suitable size and shape. The charging unit may have a size and shape similar to a conventional packet of cigarettes. Providing a portable charging unit may enable a user to carry the charging unit with the aerosol-generating device. Advantageously, this may enable the rechargeable electrical power supply of the aerosol-generating device to be made smaller and more lightweight without sacrificing the operating lifetime of the aerosol-generating device, which is able to be charged from the portable charging unit carried by the user when the rechargeable power supply of the device is depleted.

The electrical contacts of the first and second connector parts may be made from any suitable electrically conductive material. For example, the electrical contacts may be made from a metal such as copper or gold. In some embodiments the electrical contacts are made from the same material and in other embodiments, the electrical contacts are made from different materials.

Typically, the electrical contacts of each of the first and second connector parts are electrically separated or isolated from each other. The first, second and third electrical contacts of the first connector part may be electrically separated or isolated from each other. Similarly, the first, second and third electrical contacts of the second connector part may be electrically separated or isolated from each other. The electrical separation or isolation of the electrical contacts of each connector part may be provided by an electrically insulating material arranged between adjacent electrical contacts. The electrical separation or isolation may be provided by spacing apart adjacent electrical contacts.

As used herein, 'electrically conductive' refers to material having an electrical resistivity of $1 \times 10^{-4}$ $\Omega$m, or less. As used herein, 'electrically insulating' refers to material having an electrical resistivity of $1 \times 10^{4}$ $\Omega$m or more.

The electrical contacts of the first and second connector parts may be any suitable type of electrical contact. The electrical contacts may be resilient contacts. For example, the electrical contacts may be leaf spring contacts. The electrical contacts may be pin contacts. Pin contacts may extend or project outwards from a surface, typically substantially perpendicularly to the plane of the surface. The pin contacts may be resilient pin contacts or 'pogo pin' contacts. In other words, the pin contacts may be resilient or spring loaded contacts. The electrical contacts may be plate contacts. Plate contacts may extend substantially on or in a plane or on or along a surface. The electrical contacts may be provided on a printed circuit board. In some embodiments, all of the electrical contacts may be the same type of electrical contact. In other embodiments, the electrical contacts may comprise different types of electrical contact. The electrical contacts of the first connector part may comprise one type of electrical contact and the electrical contacts of the second connector part may comprise a different type of electrical contact.

The first, second and third electrical contacts of the first connector part may be the same type of electrical contact. Typically, the electrical contacts of the first connector part are plate electrical contacts. In other words, typically the electrical contacts of the first connector part extend substantially on or in a plane or on or along a surface of the first connector part. Typically, the first connector part comprises one or more surfaces and each one of the first, second and third electrical contacts of the first connector part extends substantially on or along one of the one or more surfaces of the first connector part.

The first, second and third electrical contacts of the first connector part may be arranged in any suitable arrangement.

In some embodiments, the first, second and third electrical contacts of the first connector part are substantially annular. In other words, each one of the first electrical contact, the second electrical contact, and the third electrical contact of the first connector part may form a ring. The first, second and third electrical contacts of the first connector part may form concentric rings.

In some particular embodiments:

the first electrical contact of the first connector part is substantially circular and is arranged around the at least one side wall of the recess;

the second electrical contact of the first connector part is arranged at the face and forms a ring circumscribing the recess and the first electrical contact; and the third electrical contact of the first connector part is arranged at the face and forms a ring circumscribing the recess and the first and second electrical contacts.

The first, second and third electrical contacts of the second connector part may be the same type of electrical contact. Typically, the electrical contacts of the second connector part are pin electrical contacts. In other words, typically the electrical contacts of the second connector part extend outwards from a plane or surface of the second connector part, typically substantially perpendicularly to the plane or surface. Typically, the second connector part comprises parallel surfaces on which the first, second and third electrical contacts are arranged. In these embodiments, each one of the first, second and third electrical contacts of the first connector part extends perpendicularly from the surface on which it is arranged.

The electrical contacts of the second electrical connector part may be resilient electrical contacts. In particular, the electrical contacts of the second electrical connector part may be pogo pin electrical contacts. Pogo pin electrical contacts may advantageously help to maintain a reliable electrical connection between the first and second connector parts when the first and second connector parts are electrically engaged and are exposed to vibrations and small movements caused by movement of the user.

In some preferred embodiments, the first second and third electrical contacts of the second connector may extend substantially in different directions. The second and third electrical contacts may extend in the same, substantially parallel direction, and the first electrical contact may extend in a different direction, substantially perpendicular to the direction of the first and third electrical contacts.

Preferably, the first connector part comprises a substantially planar face and a recess arranged substantially centrally in the substantially planar face. The recess may extend inwards, substantially perpendicularly from the planar face. The recess may have a closed end, an open end at the face and at least one sidewall extending between the open end and the closed end. The first electrical contact of the first connector part may be arranged within the recess. Preferably, the first electrical contact is arranged at the at least one sidewall of the recess. The first electrical contact may substantially circumscribe the closed end of the recess. The second electrical contact of the first connector part is arranged at the face and substantially circumscribes the recess and the first electrical contact. The third electrical contact of the first connector part is arranged at the face and substantially circumscribes the recess and the first and second electrical contacts.

Preferably, the second connector part comprises a substantially planar face and a projection arranged substantially centrally in the planar face. The projection may extend outwards from the face, substantially perpendicularly to the plane of the face. The projection may be configured to be received in the recess of the first connector part. The projection may have an end face and at least one sidewall extending between the face and the end face of the projection. The first electrical contact of the second connector part may be arranged at the at least one sidewall of the projection. The second electrical contact of the second connector part may be arranged at the planar face. The third electrical contact of the second connector part may be arranged at the planar face.

The second electrical contact of the second connector part may be radially spaced from the projection by a first distance. The third electrical contact of the second connector part may be radially spaced from the projection by a second distance. The second distance may be greater than the first distance.

The first and second connector parts may be electrically engaged by inserting the projection of the second connector part into the recess of the first connector part.

The projection may be tapered. The projection may have a width or diameter at the face that is greater than the width or diameter of the projection at the end face. Advantageously, this may facilitate insertion of the projection of the second connector part into the recess of the first connector part where the face of the first connector part is not aligned with the face of the second connector part. In other words, this may facilitate insertion of the projection into the recess where the first connector part is inclined to the second connector part. The interface between the end face of the projection and the at least one sidewall of the projection may be rounded. The interface between the end face of the projection and the at least one sidewall of the projection may be bevelled. Advantageously, providing a rounded or bevelled interface between the end face of the projection and the at least one sidewall of the projection may further facilitate insertion of the projection into the recess where the first and second connector parts are not fully aligned.

When the first and second connector parts are electrically engaged:

the first electrical contact of the second connector part, at the at least one sidewall of the projection, may electrically engage the first electrical contact of the first connector part, at the at least one sidewall of the recess;

the second electrical contact of the second connector part, at the face of the second connector part, may electrically engage the second electrical contact of the first connector part, at the face of the first connector part; and the third electrical contact of the second connector part, at the face of the second connector part, may electrically engage the third electrical contact of the first connector part, at the face of the first connector part.

In these embodiments, the recess and the projection of the first and second connector parts may be substantially circularly cylindrical. This may enable the first and second connector parts to be freely rotated relative to each other about the axes of the recess and projection. This may enable the first and second connector parts to be electrically engaged regardless of the angular position of the first connector part relative to the second connector part.

The second electrical contact of the second connector part arranged at the at least one sidewall of the projection may closely fit inside the recess of the first connector part, such as by a friction or interference fit, in order to achieve a reliable electrical engagement with the second electrical contact of the first connector part on the at least one sidewall of the recess. The second electrical contact of the second connector part and the recess may be configured such that the second electrical contact of the second connector part snap fits into the recess when the projection is received in the recess and the first and second connector parts are electrically engaged.

The first and second connector parts may have any suitable additional number of electrical contacts, and the additional electrical contacts may be configured to perform any desired functions.

In particular, the second connector part may comprise a fourth electrical contact. The fourth electrical contact may be arranged at the face.

The fourth electrical contact may be radially spaced from the projection by the first distance. In other words, the fourth electrical contact may be radially spaced from the projection by the same distance as the second electrical contact. The fourth electrical contact of the second connector part may be arranged to contact the second electrical contact of the first connector part when the first and second connector parts are electrically engaged. The fourth electrical contact of the second connector part may be arranged to electrically engage the second electrical contact of the first connector part when the first and second connector parts are electrically engaged.

Preferably, the fourth electrical contact is radially spaced from the projection by the second distance. In other words, the fourth electrical contact may be radially spaced from the projection by the same distance as the third electrical contact. The fourth electrical contact of the second connector part may be arranged to contact the third electrical contact of the first connector part when the first and second connector parts are electrically engaged. The fourth electrical contact of the second connector part may be arranged to electrically engage the third electrical contact of the first connector part when the first and second connector parts are electrically engaged.

The fourth electrical contact may be angularly spaced from the third electrical contact of the second connector part.

The fourth electrical contact may be configured as an insertion detection contact, to detect when the first and second connector parts are electrically engaged. The fourth electrical contact may be configured to detect when the first and second connector parts are electrically engaged in any suitable manner. In one specific example, the fourth electrical contact is arranged to connect with a ground connection on the first connector part. Thus, a controller can detect when the fourth contact has been pulled to ground which indicates that the first and second connector parts are electrically engaged with one another.

In another example, the fourth electrical contact may be a resilient pin contact in communication with a switch that closes when the resilient pin contact is compressed. The switch may be connected to the controller of the charging unit, which may be configured to determine that the first connector part is electrically engaged with the second connector part when the switch is closed.

The recess may have any suitable shape and dimensions. The recess may be substantially cylindrical. The recess may have a substantially circular transverse cross-section. The diameter of the recess is less than the diameter of the face. The diameter of the recess may be equal to or less than 75% of the diameter of the face or may be equal to or less than about 21% of the diameter of the face.

The projection may have any suitable shape and dimensions. The projection may be substantially cylindrical. The projection may have a substantially circular transverse cross-section. The diameter of the projection is less than the diameter of the face. The diameter of the projection may be equal to or less than 75% of the diameter of the face or may be equal to or less than about 21% of the diameter of the face.

In some embodiments, the intersection between the end face and the at least one sidewall of the projection may be inclined, bevelled or chamfered to facilitate location of the projection in the recess of the first connector part.

The second connector part may comprise a body on which the electrical contacts are mounted. The projection may be formed integrally with the body or may be a separate part that is secured to a main body portion.

The aerosol-generating device has one of the first connector part and the second connector part and the charging unit has the other one of the first connector part and the second connector part. In some embodiments, the first connector part may be provided on the device and the second connector part may be provided on the charging unit. Where the electrical contacts of the second connector part are pin contacts, it may be advantageous to provide the second connector on the charging unit, since the charging unit may provide improved protection for the pin contacts from damage.

The aerosol-generating device may have a proximal end and a distal end, opposite the proximal end. The proximal end may be the end at which a user draws on the aerosol-generating device to inhale aerosol generated by the device. Accordingly, the proximal end may also be referred to as the mouth end. One of the first and second connector parts may be provided at the distal end of the aerosol-generating device. One of the first and second connector parts may be provided at a distal end face of the aerosol-generating device.

The aerosol-generating device may have any suitable size and shape.

The aerosol-generating device may have a transverse cross-section of any suitable shape. For example, the aerosol-generating device may have a substantially circular, elliptical, triangular, square, rhomboidal, trapezoidal, pentagonal, hexagonal or octagonal transverse cross-section. In some particular embodiments, the aerosol-generating device has a substantially circular transverse cross-section.

The aerosol-generating device may have a substantially constant transverse cross-section along its length. The aerosol-generating device may have a substantially circular transverse cross-section along its length. The device may have rotational symmetry about its longitudinal axis. The device may have rotational symmetry of an order greater than one about its longitudinal axis. The device may be substantially axisymmetric about its longitudinal axis. In particular embodiments, the aerosol-generating device may be substantially circularly cylindrical.

The aerosol-generating device may have any suitable diameter and any suitable length. The aerosol-generating device may be elongate. In some particular embodiments, the aerosol-generating device may have a shape, diameter and length substantially similar to a conventional cigarette or cigar. The aerosol-generating device may have a length between about 30 mm and about 121 mm or between about 21 mm and 120 mm or between about 90 mm and 100 mm. The aerosol-generating device may have an external diameter between about 5 mm and about 30 mm or between about 10 mm and about 20 mm or about 25 mm.

The aerosol-generating device may be configured to receive one or more of a cartridge, a heater and an aerosol-generating article. The aerosol-generating device may be configured to receive one or more of a cartridge, a heater and an aerosol-generating article at a proximal end. The device may comprise a cavity for receiving one or more of a cartridge, a heater and an aerosol-generating article.

In some embodiments, the aerosol-generating device may comprise a heater. Where the aerosol-generating device comprises a heater, the device may be configured to receive an article comprising an aerosol-forming substrate or a cartridge comprising an aerosol-forming substrate. In other embodiments, the aerosol-generating device may be configured to receive a heater or a combination of a heater and an article or a cartridge comprising an aerosol-forming substrate. Where the device comprises a cavity for receiving one or more of a cartridge and an aerosol-generating article, the atomizer may be arranged in the cavity.

The device may comprise the one of the first and second connector parts at the distal end of the device. The device may comprise the one of the first and second connector parts at a distal end face of the device. In other words, a face at the distal end of the device, opposite the mouth end, may comprise the one of the first and second connector parts. The distal end face of the device may be substantially circular.

The aerosol-generating device may comprise a housing. In particular embodiments, the housing may be substantially circularly cylindrical. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. In particular embodiments, the material is light and non-brittle.

The rechargeable electrical power supply of the aerosol-generating device may be housed within the housing. The housing may comprise a cavity for receiving one or more of an aerosol-generating article and a cartridge. The aerosol-generating device may comprise a heater. The heater may be a resistive electric heater, or an induction heater etc. Where the device comprises a cavity for receiving an aerosol-generating article or a cartridge, the heater may be arranged in the cavity.

The aerosol-generating device may comprise electrical circuitry. The electric circuitry may be configured to control the transfer of power from the charging unit to the aerosol-generating device when the first and second connector parts are in electrical engagement. The electric circuitry may be configured to control the transfer of data from one or more of the charging unit to the aerosol-generating device and the aerosol-generating device to the charging unit. The electric circuitry may comprise a microprocessor. The electrical circuitry may comprise a controller, such as a microcontroller.

The charging unit may have any suitable size and shape. The charging unit may have a transverse cross-section of any suitable shape. For example, the charging unit may have a substantially circular, elliptical, triangular, square, rhomboidal, trapezoidal, pentagonal, hexagonal or octagonal transverse cross-section. In some particular embodiments, the aerosol-generating device has a substantially rectangular transverse cross-section.

The charging unit may have a substantially constant transverse cross-section along its length.

The charging unit may have a substantially rectangular transverse cross-section along its length. In particular embodiments, the charging unit may be a substantially rectangular cuboid.

The charging unit may have any suitable diameter and any suitable length. The charging unit may be handheld. In some embodiments, the charging unit may have a shape, diameter and length substantially similar to a conventional pack of cigarettes. The charging unit may have a length between about 21 mm and about 200 mm. The charging unit may have an external diameter between about 10 mm and about 121 mm, or between about 21 mm and about 100 mm.

The charging unit may have a cavity configured to receive the aerosol-generating device. The cavity may be configured to receive a distal end of the aerosol-generating device. The cavity may be configured to receive the entire aerosol-generating device. The cavity of the charging unit may have any suitable size and shape for receiving the aerosol-generating device.

The cavity of the charging unit may have a transverse cross-section of any suitable shape. For example, the cavity may have a substantially circular, elliptical, triangular, square, rhomboidal, trapezoidal, pentagonal, hexagonal or octagonal transverse cross-section. In particular embodiments, the cavity of the charging unit may have a transverse cross-section of substantially the same shape as the transverse cross-section of the aerosol-generating device to be received in the cavity. In some particular embodiments, the cavity may have a substantially circular cross-section.

The cavity of the charging unit may have a substantially constant transverse cross-section along its length. The cavity may have a substantially circular transverse cross-section along its length. The cavity may be substantially circularly cylindrical. The cavity may be substantially axisymmetric about its longitudinal axis.

The cavity of the charging unit may have any suitable diameter and any suitable length.

In particular embodiments, the cavity of the charging unit may have a diameter greater than the diameter of the aerosol-generating device. Providing the cavity with a diameter that is greater than the diameter of the aerosol-generating device may facilitate insertion of the aerosol-generating device into the cavity.

The cavity of the charging unit may be elongate. The cavity may have a length that is less than the length of the aerosol-generating device so that when the distal end of the aerosol-generating device is received in the cavity of the charging unit the proximal or downstream end of the aerosol-generating device projects from the cavity. The cavity of the charging unit may have a length that is substantially equal to or slightly greater than the length of the aerosol-generating device such that substantially the entire length of the aerosol-generating device is received in the cavity of the charging unit. Advantageously, this may enable the device to be entirely enclosed within the cavity and may enable the charging unit to protect the device from the external environment.

One of the first and second connector parts may be arranged in the cavity of the charging unit. This arrangement may substantially shield or protect the connector part from the external environment. The cavity may have an open end. The open end may enable the aerosol-generating device to be inserted into the cavity and removed from the cavity. The cavity may also have a closed end, opposite the open end. The one of the first and second connector parts may be arranged at the closed end of the cavity of the charging unit.

In some particular embodiments, one of the first and second connector parts may be arranged at an end face at the distal end of the aerosol-generating device and the other one of the first and second connector parts may be arranged at an end face at the closed end of the cavity of the charging unit.

In these particular embodiments, the first and second connector parts may be electrically engaged by inserting the distal end of the aerosol-generating device into the open end of the cavity of the charging unit and bringing the connector part arranged at the distal end face of the device into contact with the connector part arranged at the closed end face of the cavity of the charging unit.

In some preferred embodiments, the cavity of the charging unit may be configured to receive an aerosol-generating device laterally. In other words, the cavity of the charging unit may have an opening at a side for receiving the aerosol-generating device. In these embodiments, the cavity may be defined by two closed ends spaced apart in a longitudinal direction, and a sidewall extending between the two closed ends. The sidewall may define a base of the cavity. The sidewall and the two closed ends may define a trough into which an aerosol-generating device can be seated. One side of the cavity may be open. One side of the cavity may be open so that an aerosol-generating device can be inserted into the cavity by moving the aerosol generating device sideways or laterally into the cavity, in a direction substantially perpendicular to the longitudinal direction. This may facilitate insertion of an aerosol-generating device into the cavity, and facilitate removal of an aerosol-generating device from the cavity. Advantageously, providing an aerosol-generating system having a charging unit with a cavity that is configured to receive the aerosol-generating device laterally with an electrical connector according to the present disclosure may minimise the risk of damaging the first and second connector parts during connection and disconnection of the first and second connector parts due to the lateral movement of the aerosol-generating device into the cavity.

Where the aerosol-generating device and the cavity of the charging unit are substantially circularly cylindrical, the aerosol-generating device may be freely rotated about its longitudinal axis in the cavity. In these embodiments, the first and second connector parts enable the device to be inserted into the cavity at any angular position relative to the cavity of the charging unit and enable the aerosol-generating device to be rotated in the cavity without breaking the electrical connection between the first and second connector parts.

The charging unit may comprise a housing. In particular embodiments, the housing may be a substantially rectangular cuboid. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. In particular embodiments, the material is light and non-brittle.

Where the charging unit comprises a cavity for receiving the aerosol-generating device, the housing may define the cavity. The charging unit may comprise means for closing an open end of the cavity, such as a lid hingedly connected to the housing.

Where the charging unit comprises an electrical power supply, the electrical power supply may be housed in the housing. The charging unit may comprise means for connecting the charging unit to an external electrical power supply, such as a mains power supply, for recharging the electrical power supply of the charging unit.

The charging unit may comprise electrical circuitry. The electric circuitry may be configured to control the transfer of power from the charging unit to the aerosol-generating device when the first and second connector parts are in electrical engagement. The electric circuitry may be configured to control the transfer of data from one or more of the charging unit to the aerosol-generating device and the aerosol-generating device to the charging unit. The electric circuitry may comprise a microprocessor. The electric circuitry may comprise a controller, such as a microcontroller.

The electrically operated aerosol-generating system may further comprise a retention device for releasably retaining electrical engagement of the first connector part and the second connector part when the aerosol-generating device is received by the charging unit.

The retention device may be any suitable means for releasably retaining the electrical engagement of the first and second connector parts. For example, the retention device may comprise a friction fit between the aerosol-generating device and the charging unit, when the aerosol-generating device is received by the charging unit. For example, the retention device may comprise a closure, such as a lid, configured to removably cover the open end or side of the cavity of the charging unit. For example, the retention device may comprise resilient means arranged on the charging unit to urge the first connector part against the second connector part when the aerosol-generating device is received by the charging unit. The resilient retention device may comprise a spring, such as a leaf spring.

In some preferred embodiments, the retention device may comprise a magnetic retention device. The magnetic retention device may comprise a first magnetic element and a second magnetic element. The first magnetic element may be provided in the aerosol-generating device and the second magnetic element may be provided in the charging unit.

The first and second magnetic elements may be arranged such that the first and second magnetic elements are proximate each other when the aerosol-generating device is received by the charging unit. The first and second magnetic elements may be arranged such that the first and second magnetic elements are attracted to each other when the aerosol-generating device is received by the charging unit. The first and second magnetic elements may be arranged such that the first and second connector parts are releasably retained in electrical engagement when the aerosol-generating device is received by the charging unit.

The term 'magnetic element' is used herein to describe an element that comprises a magnetic material. The term 'magnetic material' is used herein to describe a material which is able to interact with a magnetic field, including both paramagnetic and ferromagnetic materials. A magnetisable material may be a paramagnetic material, such that it only remains magnetised in the presence of an external magnetic field. Alternatively, a magnetisable material may be a material which becomes magnetised in the presence of an external magnetic field and which remains magnetised after the external field is removed (a ferromagnetic material, for example). The term "magnetic material" as used herein encompasses both types of magnetisable material, as well as material which is already magnetised.

At least one of the first and second magnetic elements may comprise an alloy of neodymium, such as neodymium, iron and boron. In other words, at least one of the first and second magnetic elements may be a neodymium magnet. At least one of the first and second magnetic elements may comprise a ferromagnetic stainless steel, such as SS430 stainless steel.

The first magnetic element may be arranged proximate the one of the first and second connector parts of the aerosol-generating device. The second magnetic element may be arranged proximate the other one of the first and second connector parts of the charging unit. In this arrangement, when the first and second connector parts are not electrically engaged, the magnetic retention device may cause the first and second connector parts to be drawn together into electrical engagement. Advantageously, this provides a degree of self-alignment and self-engagement to the first and second connector parts, facilitating electrical engagement. Accordingly, the magnetic retention device may further improve the speed and ease with which a user is able to electrically connect a device and a charging unit. When the first and second connector parts are electrically engaged, the magnetic retention device increases the specific force required to disengage the first and second connector parts. Advantageously, this substantially inhibits or prevents the first and second connector parts from becoming unintentionally disengaged, for example though vibrations and rotation during transit.

As used herein, the term "proximate" is used to describe a relative arrangement of two objects in close proximity to each other, such as adjacent or neighbouring objects. Magnetic material arranged proximate to a connector part refers to magnetic material that is arranged at or on the connector part or separated from the connector part by a short distance. In this context, a short distance is a distance that is small relative to the dimensions of the aerosol-generating device and the charging unit.

In some embodiments, at least one of the first and second magnetic elements may form one or more of the electrical contacts of the connector parts. For example, the third electrical contact of the first connector part may be formed from a magnetic material. In embodiments where magnetic material does not form one of the electrical contacts, the magnetic material may be electrically isolated from the electrical contacts of the connector part.

The first magnetic element may be arranged at or around the connector part of the aerosol-generating device. The first magnetic element may comprise a body of magnetic material arranged substantially behind the electrical contacts of the connector part of the aerosol-generating device. Where the device comprises the connector part at the distal end face, the first magnetic element may be arranged proximally of the connector part in the device. Where the aerosol-generating device comprises the first connector part, the first magnetic element may comprise at least one of the electrical contacts of the first connector part. In particular, the third electrical contact may comprise a magnetic material, such that the third electrical contact is the first magnetic element. In embodiments where the first magnetic element is not one or more of the electrical contacts, the first magnetic element may be electrically isolated from the electrical contacts of the first connector part.

The second magnetic element may be arranged at or around the connector part of the charging unit. The second magnetic element may comprise a body of magnetic material arranged substantially behind the electrical contacts of the connector part of the charging unit. Where the charging unit comprises the second connector part, the second magnetic element may comprise one or more bodies of magnetic material arranged between or around the electrical contacts of the second connector part. In particular, the second magnetic element may comprise two bodies of magnetic material arranged at opposite sides of the electrical contacts of the second connector part, such that the electrical contacts of the second connector part are arranged between the two bodies of magnetic material. The two bodies of magnetic material may be substantially arcuate and may have the same or a similar curvature to the third electrical contact of the first connector part.

The first and second magnetic elements may be any suitable shape. For example, the first and second magnetic elements may be substantially circular, elliptical or square. The first and second magnetic elements may be the same shape. The first and second magnetic elements may be different shapes. The first and second magnetic elements may be substantially annular. The first and second magnetic elements may comprise an annular body, ring or tube of magnetic material. Providing an annular body, ring or tube of magnetic material may be advantageous, as the annular body or tube may comprise a central passage through which electrical connectors may pass to connect one or more electrical contacts of the connector part to an electrical power supply of the device or the charging unit.

Where the charging unit comprises a cavity and the connector part of the charging unit is arranged at a closed end of the cavity, the first and second magnetic elements may be arranged such that the magnetic north-south polarity of the magnetic materials is substantially aligned with the longitudinal axis of the cavity. This may enable the magnetic retention device to help draw the aerosol-generating device into the cavity and locate the first and second connector parts in electrical engagement.

In some preferred embodiments, the first connector part comprises a first magnetic element, and the second connector part comprises a second magnetic element. Preferably, at least one of the electrical contacts of the second connector part is a resilient contact that is actuable between an extended position and a depressed position, and is biased to return to the extended position. In these preferred embodiments, the first and second connector parts are positionable in a first connection position, wherein: the at least one resilient contact of the second connector part is in the extended position; the first connector part is arranged in contact with the at least one resilient contact; the first and second magnetic elements are magnetically attracted to each other, and the force of the magnetic attraction between the first and second s is greater than the force required to move the at least one resilient contact from the extended position to the depressed position.

The at least one resilient contact of the second connector part enables the first and second connector parts to maintain an electrical connection at a range of positions along the length of travel of the at least one resilient contact between the extended and depressed positions. The length of travel of the at least one resilient contact, between the extended position and the depressed position, may be any suitable distance. The length of travel of the at least one resilient contact between the extended position and the depressed position may be at least 0.1 millimetres, at least 0.2 millimetres or at least 0.3 millimetres. The length of travel of the at least one resilient contact between the extended position and the depressed position may be between about 0.1 millimetres and about 1.5 millimetres, between about 0.2 millimetres and about 1 millimetres or between about 0.3 mm and about 0.7 mm.

The at least one resilient contact of the second connector part is biased to return to the extended position. When the at least one resilient contact is depressed from the extended position towards the depressed position by the first connector part, the at least one resilient contact exerts a biasing force on the first part in the direction of the extended position. The first and second magnetic elements are arranged to provide a force of magnetic attraction between the first and second connector parts that acts in the opposite direction to the biasing force of the at least one resilient contact. When the first and second connector parts are in the first connection position, the force of the magnetic attraction between the first and second magnetic elements is greater than the force required to move the at least one resilient contact from the extended position to the depressed position. Advantageously, such a force of magnetic attraction is able to overcome the biasing force of the at least one resilient contact when the first and second connector parts are in the first connection position and draw the first and second connector parts together. In other words, when the first and second connector parts are in the first connection position, the first and second connector parts tend to be drawn towards each other by the magnetic attraction force and the at least one resilient contact of the second connector part is depressed from the extended position towards the depressed position by the first connector part Advantageously, as a user moves the aerosol-generating device and the charging unit into electrical engagement, the force of magnetic attraction between the first and second magnetic elements is such that a user does not experience resistance from the biasing force of the at least one resilient contact as the first and second connector parts engage at the first connection position and as the at least one resilient contact is depressed from the extended position towards the depressed position. In other words, the force of magnetic attraction between the first and second magnetic elements at the first connection position is great enough to hide or mask the biasing force of the at least one resilient contact from a user brining the aerosol-generating device into electrical connection with the charging unit.

When the first and second connector parts are in the first connection position, the force of magnetic attraction between the first and second magnetic elements may be any suitable magnitude. When the first and second connector parts are in the first connection position, the force of magnetic attraction between the first and second magnetic elements may be at least 0.1 Newtons, at least 0.15 Newtons or at least 0.2 Newtons, at least 0.5 Newtons, at least 1 Newton or at least 1.5 Newtons. When the first and second connector parts are in the first connection position, the force of magnetic attraction between the first and second magnetic elements may be at least 0.15 Newtons. When the first and second connector parts are in the first connection position, the force of magnetic attraction between the first and second magnetic elements may be between about 0.1 Newtons and about 10 Newtons, between about 0.5 Newtons and about 5 Newtons or between about 1.5 Newtons and about 4.0 Newtons.

In some preferred embodiments, the first and second connector parts may be further positionable in a second connection position, wherein: at least one of the electrical contacts of the first connector part is electrically connected to at least one of the electrical contacts of the second connector part; the first and second magnetic elements are magnetically attracted to each other; and the at least one resilient contact of the second connector is in the depressed position.

When the first and second connector parts are positioned in the second connection position, the at least one resilient contact in the depressed position exerts a biasing force on the first connector part. In some embodiments, when the first and second connector parts are positioned in the second connection position the force of magnetic attraction between the first and second magnetic elements is greater than the biasing force exerted by the at least one resilient contact on the first connector part. Such a force of magnetic attraction ensures that the biasing force of the at least one resilient contact of the second connector part cannot urge the first and second connector parts out of the second connection position.

In some preferred embodiments, when the first and second connector parts are in the second connection position the force of magnetic attraction between the first and second magnetic elements is greater than the weight of the aerosol-generating device and the biasing force of the at least one resilient contact on the first connector part. Such a force of magnetic attraction ensures that first and second connector parts may be held in the second connection position regardless of the orientation of the system.

When the first and second connector parts are not electrically engaged, the force of magnetic attraction between the first and second magnetic elements may cause the first and second connector parts to be drawn together into electrical engagement. Advantageously, this provides a degree of self-alignment and self-engagement to the first and second connector parts, facilitating electrical engagement. This may further improve the speed and ease with which a user is able to electrically connect a device and a charging unit. When the first and second connector parts are electrically connected, the force of magnetic attraction between the first and second magnetic elements increases the force required to disengage the first and second connector parts. Advantageously, this substantially inhibits or prevents the first and second connector parts from becoming unintentionally disengaged, for example though vibrations and rotation during transit.

When the first and second connector parts are in the second connection position, the force of magnetic attraction between the first and second magnetic elements may be any suitable magnitude. When the first and second connector parts are in the second connection position, the force of magnetic attraction between the first and second magnetic elements may be at least 0.5 Newtons, at least 1 Newton, at least 1.5 Newtons, at least 2 Newtons, at least 3 Newtons or at least 4 Newtons. When the first and second connector parts are in the second connection position, the force of magnetic attraction between the first and second magnetic elements may be at least 1 Newtons. When the first and second connector parts are in the second connection position the force of magnetic attraction between the first and second magnetic elements may be between about 0.5 Newtons and about 10 Newtons, between about 1 Newton and about 5 Newtons or between about 1.5 Newtons and about 4 Newtons. When the first and second connector parts are in the second connection position the force of magnetic attraction between the first and second magnetic elements may be between about 1.5 Newtons and about 4 Newtons.

According to the disclosure, there is also provided an electrically operated aerosol-generating device comprising an electrical connector part. The electrical connector part comprises a face and a recess arranged substantially centrally in the face. The electrical connector part further comprises: a first electrical contact arranged within the recess; a second electrical contact arranged at the face and substantially circumscribing the first electrical contact; and a third electrical contact arranged at the face and substantially circumscribing the second electrical contact.

In some preferred embodiments, the recess has a closed end, an open end at the face, and at least one sidewall extending between the open end and the closed end. Preferably, the first electrical contact is arranged on the at least one sidewall of the projection. No electrical contacts are arranged at the closed end of the recess.

In some embodiments, the electrically operated aerosol-generating device may comprise one or more of: a cavity for receiving an aerosol-forming substrate; an electric heater for heating an aerosol-forming substrate received in the cavity; a rechargeable power supply for supplying power to the electric heater; and electric circuitry for controlling the supply of power to the electric heater from the power supply and electrically connected to the electrical connector part for the transfer of at least one of power and data through the electrical connector part.

The electrical connector part may be arranged at an end face of the aerosol-generating device. Where the device comprises a cavity for receiving an aerosol-forming substrate at one end, the electrical connector part may be arranged at the opposite end.

According to the disclosure, there is also provided a charging unit for charging an aerosol-generating device, the charging unit comprising: a housing having a cavity for receiving an electrically operated aerosol-generating device; and an electrical connector part arranged to electrically connect to the electrically operated aerosol-generating device when the device is received in the cavity. The electrical connector part comprises: a face and a projection arranged substantially centrally in the face; a first electrical contact arranged on the projection; a second electrical contact arranged at the face, spaced radially outwardly from the first electrical contact; and a third electrical contact arranged at the face, spaced radially outwardly from the first electrical contact and the second electrical contact.

In some preferred embodiments, the projection has an end face and at least one sidewall extending between the face and the end face of the projection. Preferably, the first electrical contact is arranged on the at least one sidewall of the projection. No electrical contacts are arranged on the end face of the projection.

The electrical connector part may be arranged at a closed end of the cavity for receiving an electrically operated aerosol-generating device.

According to the disclosure, there is also provided an electrical connector for an electrically operated aerosol-generating system. The electrical connector comprises a first connector part and a second connector part. The first connector part includes: a first electrical contact; a second electrical contact at least partially circumscribing the first electrical contact; and a third electrical contact at least partially circumscribing the first electrical contact. The second connector part includes: a face and a projection arranged substantially centrally in the face; a first electrical contact arranged on the projection; a second electrical contact arranged at the face, spaced radially outwardly from the first electrical contact; and a third electrical contact arranged at the face, spaced radially outwardly from the first electrical contact and the second electrical contact.

In some preferred embodiments, the projection has an end face and at least one sidewall extending between the face and the end face of the projection. Preferably the first electrical contact of the second connector part is arranged on the at least one sidewall of the projection. No electrical contacts are arranged on the end face of the projection.

When the first and second connector parts of the electrical connector are electrically engaged: the first electrical contact of the first connector part electrically engages the first electrical contact of the second connector part; the second electrical contact of the first connector part electrically engages one of the second electrical contact and the third electrical contact of the second connector part; and the third electrical contact of the first connector part electrically engages the other one of the second electrical contact and the third electrical contact of the second connector part, regardless of the rotational orientation of the second connector part relative to the first connector part.

The invention is defined in the claims. However, below there is provided a non-exhaustive list of non-limiting examples. Any one or more of the features of these examples may be combined with any one or more features of another example, embodiment, or aspect described herein.

EX1. An electrically operated aerosol-generating system comprising:

an aerosol-generating device;

a charging unit configured to receive the aerosol-generating device; and a first connector part and a second connector part, the aerosol-generating device having one of the first connector part and the second connector part and the charging unit having the other one of the first connector part and the second connector part, wherein:

the first connector part comprises: a first electrical contact; a second electrical contact substantially circumscribing the first electrical contact; and a third electrical contact substantially circumscribing the second electrical contact;

the second connector part comprises: a face and a projection arranged substantially centrally in the face; a first electrical contact arranged on the projection; a second electrical contact arranged at the face, spaced radially outwardly from the first electrical contact; and a third electrical contact arranged at the face, spaced radially outwardly from the first electrical contact and the second electrical contact;

the first and second connector parts are arranged such that when the aerosol-generating device is received by the charging unit the first and second connector parts electrically engage; and the electrical contacts of the first and second connector parts are arranged such that when the first and second connector parts electrically engage:

the first electrical contact of the first connector part electrically engages the first electrical contact of the second connector part;

the second electrical contact of the first connector part electrically engages the second electrical contact of the second connector part; and the third electrical contact of the first connector part electrically engages the third electrical contact of the second connector part, regardless of the angular position of the second connector part relative to the first connector part.

EX2. An electrically operated aerosol-generating system according to example EX1, wherein the projection is defined by an end face and at least one sidewall extending between the face and the end face of the projection.

EX3. An electrically operated aerosol-generating system according to example EX2, wherein the first electrical contact of the second connector part is arranged at the at least one sidewall of the projection.

EX4. An electrically operated aerosol-generating system according to example EX2 or EX3, wherein no electrical contacts are arranged at the end face of the projection of the second connector part, more particularly there is no electrical contact arranged at the centre of the end face of the projection of the second connector part and/or more particularly the only electrical contact, or electrical contacts, arranged on the projection are arranged at the at least one sidewall of the projection.

EX5. An electrically operated aerosol-generating system according to any preceding example, wherein:

the first connector part comprises a face and a recess arranged substantially centrally in the face, the projection of the second connector part being receivable in the recess of the first connector part;

the first electrical contact of the first connector part is arranged within the recess;

the second electrical contact of the first connector part is arranged at the face, the second electrical contact being radially spaced from the recess by a first distance; and the third electrical contact of the second connector part is arranged at the face, the third electrical contact being radially spaced from the recess by a second distance, greater than the first distance.

EX6. An electrically operated aerosol-generating system according to example EX5, wherein the recess is defined by a closed end face, an open end at the face, and at least one sidewall extending between the open end and the closed end face.

EX7. An electrically operated aerosol-generating system according to example EX6, wherein the first electrical contact of the first connector part is arranged at the at least one sidewall of the recess.

EX8. An electrically operated aerosol-generating system according to example EX6 or EX7, wherein no electrical contacts are arranged at the closed end face of the recess, more particularly there is no electrical contact arranged at the centre of the end face of the recess of the first connector part and/or more particularly the only electrical contact, or electrical contacts, arranged within the recess are arranged at the at least one sidewall of the recess.

EX9. An electrically operated aerosol-generating system according to any preceding example, wherein at least one of the electrical contacts of each of the first and second connector parts is configured to transfer data from at least one of the charging unit to the aerosol-generating device and the aerosol-generating device to the charging unit.

EX10. An electrically operated aerosol-generating system according to example EX9, wherein the first electrical contact of each of the first and second connector parts is configured to transfer data from at least one of the charging unit to the aerosol-generating device and the aerosol-generating device to the charging unit.

EX11. An electrically operated aerosol-generating system according to any preceding example, wherein at least one of the electrical contacts of each of the first and second connector parts is configured to transfer power from at least one of the charging unit to the aerosol-generating device and the aerosol-generating device to the charging unit.

EX12. An electrically operated aerosol-generating system according to example EX11, wherein the second electrical contact of each of the first and second connector parts is configured to transfer power from at least one of the charging unit to the aerosol-generating device and the aerosol-generating device to the charging unit.

EX13. An electrically operated aerosol-generating system according to any preceding example, wherein at least one of the electrical contacts of each of the first and second connector parts is configured as a ground connection.

EX14. An electrically operated aerosol-generating system according to example EX13, wherein the third electrical contact of each of the first and second connector parts is configured as a ground connection.

EX15. An electrically operated aerosol-generating system according to any preceding example, wherein the aerosol-generating device comprises a rechargeable electrical power supply.

EX16. An electrically operated aerosol-generating system according to any preceding example, wherein the charging unit comprises a rechargeable electrical power supply.

EX17. An electrically operated aerosol-generating system according to any preceding example, wherein:

the aerosol-generating device comprises a rechargeable electrical power supply;

the charging unit comprises a rechargeable electrical power supply;

at least one of the electrical contacts of each of the first and second connector parts is configured to transfer power from the rechargeable electrical power supply of the charging unit to the power supply of the aerosol-generating device; and at least one of the other electrical contacts of each of the first and second connector parts is configured to transfer data from at least one of the charging unit to the aerosol-generating device and the aerosol-generating device to the charging unit.

EX18. An electrically operated aerosol-generating system according to example EX17, wherein the first electrical contacts of the first and second connector parts are configured to transfer data from at least one of the charging unit to the aerosol-generating device and the aerosol-generating device to the charging unit, and the second electrical contacts of the first and second connector parts are configured to transfer power from the rechargeable electrical power supply of the charging unit to the rechargeable electrical power supply of the aerosol-generating device.

EX19. An electrically operated aerosol-generating system according to any preceding example, wherein the second connector part comprises a fourth electrical contact arranged at the face.

EX20. An electrically operated aerosol-generating system according to example EX19, wherein the fourth electrical contact is configured as an insertion detection contact to detect when the first and second connector parts are electrically engaged.

EX21. An electrically operated aerosol-generating system according to example EX20, wherein one of the electrical contacts of the first connector part is configured as a ground connection, and wherein the fourth electrical contact of the second connector part is arranged to electrically engage with the electrical contact of the first connector part that is configured as a ground connection.

EX22. An electrically operated aerosol-generating system according to example EX21, wherein the aerosol-generating device or charging unit comprises a controller configured to detect when the fourth contact is electrically engaged with a ground connection, which indicates that the first and second connector parts are electrically engaged.

EX23. An electrically operated aerosol-generating system according to any one of examples EX19 to EX22, wherein the fourth electrical contact of the second connector part is radially spaced from the projection by the first distance and angularly spaced from the second electrical contact of the second connector part, the fourth electrical contact of the second connector part being arranged to electrically engage the second electrical contact of the first connector part, and optionally the second electrical contact of the first connector part is configured as a ground connection.

EX24. An electrically operated aerosol-generating system according to any one of examples EX19 to EX22, wherein the fourth electrical contact of the second connector part is radially spaced from the projection by the second distance and angularly spaced from the third electrical contact of the second connector part, the fourth electrical contact of the second connector part being arranged to electrically engage the third electrical contact of the first connector part, and optionally the third electrical contact of the first connector part is configured as a ground connection.

EX25. An electrically operated aerosol-generating system according to any one of examples EX19 to EX24, wherein the fourth electrical contact of the second connector part is a pin contact.

EX26. An electrically operated aerosol-generating system according to any preceding example, wherein one or more of the electrical contacts of the second connector part are pin contacts.

EX27. An electrically operated aerosol-generating system according to any preceding example, wherein the first electrical contact of the second connector part is a leaf spring contact, and the second and third electrical contacts of the second connector part are pin contacts.

EX28. An electrically operated aerosol-generating system according to any preceding example, wherein the aerosol-generating device comprises a proximal end and a distal end and the charging unit comprises a cavity configured to receive at least the distal end of the aerosol-generating device, the cavity having an open end and a closed end.

EX29. An electrically operated aerosol-generating system according to example EX28, wherein:

one of the first and second connector parts is arranged at an end face at the distal end of the aerosol-generating device; and the other one of the first and second connector parts is arranged at an end face at the closed end of the cavity of the charging unit.

EX30. An electrically operated aerosol-generating system according to example EX28 or EX29, wherein the first connector part is arranged at an end face at the distal end of the aerosol-generating device; and the second connector part is arranged at an end face at the closed end of the cavity of the charging unit.

EX31. An electrically operated aerosol-generating system according to any one of examples EX28 to EX30, wherein the cavity of the charging unit is configured to receive the aerosol-generating device laterally.

EX32. An electrically operated aerosol-generating system according to any one of examples EX28 to EX31, wherein the cavity of the charging unit is defined by two closed ends spaced apart in a longitudinal direction, and a sidewall extending between the two closed ends, the sidewall defining an opening at a side of the cavity.

EX33. An electrically operated aerosol-generating system according to example EX32, wherein the opening at a side of the cavity is configured to receive the aerosol-generating device in a direction substantially perpendicular to the longitudinal direction.

EX34. An electrically operated aerosol-generating system according to any preceding example, wherein the first electrical contact of the first connector part substantially extends in a first plane, and the second and third electrical contacts of the first connector part substantially extends in a second plane, substantially perpendicular to the first plane.

EX35. An electrically operated aerosol-generating system according to any preceding example, further comprising a retention device for releasably retaining electrical engagement of the first connector part and the second connector part when the aerosol-generating device is received by the charging unit.

EX36. An electrically operated aerosol-generating system according to example EX35, wherein:

the retention device comprises a first magnetic element provided on the aerosol-generating device and a second magnetic element provided on the charging unit; and the first and second magnetic elements are arranged such that the first and second magnetic elements are proximate each other when the aerosol-generating device is received by the charging unit so that the retention device releasably retains the engagement of the first and second connector parts.

EX37. An electrically operated aerosol-generating system according to example EX36, wherein the first magnetic element is arranged proximate the one of the first and second connector parts of the aerosol-generating device and the second magnetic element is arranged proximate the other one of the first and second connector parts of the charging unit.

EX38. An electrically operated aerosol-generating device for an electrically operated aerosol-generating system as defined in any one of examples EX1 to EX37.

EX39. An electrically operated aerosol-generating device comprising an electrical connector part, the electrical connector part comprising a face and a recess arranged substantially centrally in the face; a first electrical contact arranged within the recess; a second electrical contact arranged at the face and substantially circumscribing the first electrical contact; and a third electrical contact arranged at the face and substantially circumscribing the second electrical contact.

EX40. An electrically operated aerosol-generating device according to example EX39, wherein the recess is defined by a closed end face, an open end at the face, and at least one sidewall extending between the open end and the closed end face.

EX41. An electrically operated aerosol-generating device according to example EX40, wherein the first electrical contact of the connector part is arranged at the at least one sidewall of the recess.

EX42. An electrically operated aerosol-generating device according to example EX40 or EX41, wherein no electrical contacts are arranged at the closed end face of the recess.

EX43. An electrically operated aerosol-generating device according to any one of examples EX39 to EX42, wherein the aerosol-generating device comprises a rechargeable electrical power supply.

EX44. An electrically operated aerosol-generating device according to any one of examples EX39 to EX43, wherein the connector part is arranged at an end face of the aerosol-generating device.

EX45 An electrically operated aerosol-generating device according to any one of examples EX39 to EX44, wherein the first electrical contact of the connector part substantially extends in a first plane, and the second and third electrical contacts of the connector part substantially extends in a second plane, substantially perpendicular to the first plane.

EX46. An electrically operated aerosol-generating device according to any one of examples EX39 to EX45, wherein the aerosol-generating device further comprises a magnetic element proximate the connector part.

EX47. A charging unit comprising for an electrically operated aerosol-generating system according to any one of example EX1 to EX37.

EX48. A charging unit for charging an aerosol-generating device, the charging unit comprising: a housing having a cavity for receiving an electrically operated aerosol-generating device; and an electrical connector part arranged to electrically connect to the electrically operated aerosol-generating device when the device is received in the cavity, the electrical connector part comprising: a face and a projection arranged substantially centrally in the face; a first electrical contact arranged on the projection; a second electrical contact arranged at the face, spaced radially outwardly from the first electrical contact; and a third electrical contact arranged at the face, spaced radially outwardly from the first electrical contact and the second electrical contact.

EX49. A charging unit according to example EX48, wherein the projection is defined by an end face and at least one sidewall extending between the face and the end face of the projection.

EX50. A charging unit according to example EX49, wherein the first electrical contact of the connector part is arranged at the at least one sidewall of the recess.

EX51. A charging unit according to example EX49 or EX50, wherein no electrical contacts are arranged at the end face of the projection of the connector part.

EX52. A charging unit according to any one of examples EX49 to EX51, wherein the charging unit comprises a rechargeable electrical power supply.

EX53 A charging unit according to any one of examples EX49 to EX52, wherein the connector part comprises a fourth electrical contact arranged at the face.

EX54. A charging unit according to example EX53, wherein the fourth electrical contact is configured as an insertion detection contact to detect when the connector part is electrically engaged with another connector part.

EX55. A charging unit according to example EX54, wherein the charging unit comprises a controller configured to detect when the fourth contact is electrically engaged with a ground connection, which indicates that the connector part of the charging unit is electrically engaged with another connector part.

EX56. A charging unit according to any one of examples EX53 to EX55, wherein the fourth electrical contact of the connector part is radially spaced from the projection by the first distance, and angularly spaced from the second electrical contact.

EX57. A charging unit according to any one of examples EX53 to EX55, wherein the fourth electrical contact of the connector part is radially spaced from the projection by the second distance, and angularly spaced from the third electrical contact.

EX58. A charging unit according to any one of examples EX53 to EX57, wherein the fourth electrical contact of the second connector part is a pin contact.

EX59. A charging unit according to any one of examples EX53 to EX58, wherein one or more of the electrical contacts of the second connector part are pin contacts.

EX60. A charging unit according to any one of examples EX48 to EX59, wherein the first electrical contact of the connector part is a leaf spring contact, and the second and third electrical contacts are pin contacts.

EX61. A charging unit according to any one of examples EX48 to EX60, the cavity of the charging unit is configured to receive at least a distal end of an aerosol-generating device, the cavity having an open end and a closed end.

EX62. A charging unit according to example EX61, wherein the connector part is arranged at an end face at the closed end of the cavity of the charging unit.

EX63. An electrically operated aerosol-generating system according to any one of examples EX48 to EX62, wherein the cavity of the charging unit is configured to receive the aerosol-generating device laterally.

EX64. An electrically operated aerosol-generating system according to any one of examples EX48 to EX63, wherein the cavity of the charging unit is defined by two closed ends spaced apart in a longitudinal direction, and a sidewall extending between the two closed ends, the sidewall defining an opening at a side of the cavity.

EX65. An electrically operated aerosol-generating system according to example EX64, wherein the opening at a side of the cavity is configured to receive the aerosol-generating device in a direction substantially perpendicular to the longitudinal direction.

EX66. A charging unit according to any one of examples EX48 to EX65, wherein the charging unit further comprises a magnetic element proximate the connector part.

EX67. An electrical connector for an electrically operated aerosol-generating system as defined in any one of examples EX1 to EX37.

EX68. An electrical connector for an electrically operated aerosol-generating system, the electrical connector comprising a first connector part and a second connector part, the first connector part includes: a first electrical contact; a second electrical contact at least partially circumscribing the first electrical contact; and a third electrical contact at least partially circumscribing the first electrical contact; and the second connector part includes: a face and a projection arranged substantially centrally in the face; a first electrical contact arranged on the projection; a second electrical contact arranged at the face, spaced radially outwardly from the first electrical contact; and a third electrical contact arranged at the face, spaced radially outwardly from the first electrical contact and the second electrical contact.

EX69. An electrical connector according to example EX68, wherein the projection is defined by an end face and at least one sidewall extending between the face and the end face of the projection.

EX70. An electrical connector according to example EX69, wherein the first electrical contact of the second connector part is arranged at the at least one sidewall of the recess.

EX71. An electrical connector according to example EX69 or EX70, wherein no electrical contacts are arranged at the end face of the projection of the second connector part.

EX72. An electrical connector according to any one of examples EX68 to EX71, wherein:

the first connector part comprises a face and a recess arranged substantially centrally in the face, the projection of the second connector part being receivable in the recess of the first connector part;

the first electrical contact of the first connector part is arranged within the recess; the second electrical contact of the first connector part is arranged at the face, the second electrical contact being radially spaced from the recess by a first distance; and the third electrical contact of the second connector part is arranged at the face, the third electrical contact being radially spaced from the recess by a second distance, greater than the first distance.

EX73. An electrical connector according to example EX72, wherein the recess is defined by a closed end face, an open end at the face, and at least one sidewall extending between the open end and the closed end face.

EX74. An electrical connector according to example EX73, wherein the first electrical contact of the first connector part is arranged at the at least one sidewall of the recess.

EX75. An electrical connector according to example EX73 or 74, wherein no electrical contacts are arranged at the closed end face of the recess.

EX76. An electrical connector according to any one of examples EX68 to EX75, wherein the second connector part comprises a fourth electrical contact arranged at the face.

EX77. An electrical connector according to example EX76, wherein the fourth electrical contact is configured as an insertion detection contact to detect when the first and second connector parts are electrically engaged.

EX78. An electrical connector according to example EX76 or EX77, wherein the fourth electrical contact of the second connector part is radially spaced from the projection by the first distance and angularly spaced from the second electrical contact of the second connector part, the fourth electrical contact of the second connector part being arranged to electrically engage the second electrical contact of the first connector part.

EX79. An electrical connector according to example EX76 or EX77, wherein the fourth electrical contact of the second connector part is radially spaced from the projection by the second distance and angularly spaced from the third electrical contact of the second connector part, the fourth electrical contact of the second connector part being arranged to electrically engage the third electrical contact of the first connector part.

EX80. An electrical connector according to any one of examples EX76 to EX79, wherein the fourth electrical contact of the second connector part is a pin contact.

EX81. An electrical connector according to any one of examples EX68 to EX80, wherein one or more of the electrical contacts of the second connector part are pin contacts.

EX82. An electrical connector according to any one of examples EX68 to EX81, wherein the first electrical contact of the second connector part is a leaf spring contact, and the second and third electrical contacts of the second connector part are pin contacts.

EX83 An electrical connector according to any one of examples EX68 to EX82, wherein the first electrical contact of the first connector part substantially extends in a first plane, and the second and third electrical contacts of the first connector part substantially extends in a second plane, substantially perpendicular to the first plane.

EX84. An electrical connector according to any one of examples EX68 to EX83, further comprising a retention device for releasably retaining electrical engagement of the first connector part and the second connector part when the aerosol-generating device is received by the charging unit.

EX85. An electrical connector according to example EX84, wherein:

the retention device comprises a first magnetic element provided on the first connector part, and a second magnetic element provided on the second connector part; and the first and second magnetic elements are arranged such that the first and second magnetic elements are proximate each other when the first and second connector parts are electrically engaged so that the retention device releasably retains the engagement of the first and second connector parts.

FIGS. 1 and 2 show schematic illustrations of a first connector part 1 of an electrically operated aerosol-generating system according to an embodiment of the present disclosure. The first connector part 1 is arranged at a distal end face of an aerosol-generating device (not shown). The first connector part 1 comprises three electrical contacts, a first electrical contact 3, a second electrical contact 4 and a third electrical contact 5.

The first connector part 1 comprises a substantially circular planar face 6 with a recess 7 located at the centre of the face 6. The recess 7 is substantially circularly cylindrical, having an open end at the face 6, an opposite closed end with a closed end face and a tubular sidewall extending between the open end and the closed end face. The closed end face of the recess 7 is substantially circular and lies on a plane substantially parallel to the plane of the face 6. The circular face 6 has a diameter of about 10 mm and the recess 7 has a diameter of about 4 mm, and a depth of about 4 mm.

The first electrical contact 3 is arranged within the recess 7. The first electrical contact 3 is arranged at the sidewall of the recess 7. The first electrical contact 3 is substantially tubular and extends substantially over the tubular sidewall of the recess 7. The first electrical contact 3 has a thickness of about 0.1 mm, such that positioning the first electrical contact 3 in the recess 7 does not significantly reduce the diameter of the recess 7. The first electrical contact 3 has a width of about 3.8 mm, and is positioned in the recess 7 such that the first electrical contact 3 does not extend to the closed end face of the recess 7 or out of the open end of the recess 7. There is no electrical contact arranged at the closed end face of the recess 7. The second and third electrical contacts 4, 5 are arranged at the planar face 6. The second electrical contact 4 is annular and extends over the planar face 6. The second electrical contact 4 circumscribes both the recess 7, and the first electrical contact 3. The second electrical contact 4 has an outer diameter of about 6 mm and an inner diameter of about 4.6 mm, such that the second electrical contact 4 does not overlap the recess 7 or contact the first electrical contact 3. The third electrical contact 5 is annular and extends over the planar face 6. The third electrical contact circumscribes the second electrical contact 4, the recess 7, and the first electrical contact 3. The third electrical 45 contact has an outer diameter of about 8 mm and an inner diameter of about 6.6 mm, such that the third electrical contact 5 does not contact the second electrical contact 4. In this arrangement, the first, second and third electrical contacts 3, 4, 5 are all electrically isolated from each other.

The first, second, and third electrical contacts 3, 4, 5 do not all extend in the same plane. The second, and third electrical contacts 4, 5 extend in the same plane, over the planar face 6, and the first electrical contact 3 extends on a surfaces that is substantially perpendicular to the plane of the second and third electrical contacts 4, 5, the sidewall of the recess 7.

In this embodiment, the first, second, and third electrical contacts 4, 5 are formed from SS430 stainless steel.

An advantage of the arrangement of electrical contacts 3, 4, 5 of the first connector part 1 is that the electrical contacts have circular rotational symmetry about an axis passing through the centre of the recess 7 and the first electrical contact 3. This symmetry enables the first connector part 1 to be connected to a second connector part at any rotational orientation about the axis, and present to the second connector part an identical arrangement of contacts. As such, the first connector part 1 may be connected to a second connector part at any orientation of the first connector part 1 relative to the second connector.

FIGS. 3 and 4 show schematic illustrations of a second connector part 21 of the electrically operated aerosol-generating system according to an embodiment of the disclosure. The second connector part 21 is electrically connectable to the first connector part 21 of FIGS. 1 and 2. The second connector part 21 is arranged at a closed end face of a cavity of a charging unit (not shown). The second connector part 21 comprises three electrical contacts, a first electrical contact 23, a second electrical contact 24, and a third electrical contacts 25.

The second connector part 21 comprises a substantially circular planar face 26, which is substantially the same size as the face 6 of the first connector part 1. The second connector part 21 comprises a projection 27 located at the centre of the circular planar face 26. The projection 27 extends outwards from the face 26 in a direction substantially perpendicular to the plane of the face 26. The projection 27 is substantially circularly cylindrical and comprises an end face and a tubular sidewall extending between the face 26 and the open end face of the projection 27. The end face of the projection 27 is substantially circular and lies on a plane substantially parallel to the plane of the face 26. The projection 27 has substantially the same shape as the recess 7 of the first connector part 1, with a height of about 3 mm and a maximum diameter of about 3.3 mm. The maximum diameter of the projection 27 is slightly smaller than the diameter of the recess 7, such that the projection 27 of the second connector part 21 may fit closely within the recess 7 of the first connector part 1. The diameter or width of the projection 27 reduces towards the end face of the projection 27, such that the interface between the end face and the sidewall of the projection 27 is bevelled to make it easier to locate the projection 27 within the recess 7 of the first connector part 1.

The first electrical contact 23 is arranged on the projection 27. The first electrical contact 23 is a leaf spring arranged at the sidewall of the projection 27. The first electrical contact 23 extends radially outwards from the sidewall of the projection 27, in a direction substantially perpendicular to the sidewall, and substantially parallel with the plane 26, by a maximum distance of about 0.3 mm. There is no electrical contact arranged on the end face of the projection 27. The second and third electrical contacts 24, 25 are resilient pin contacts, or 'pogo pin' contacts, arranged on the planar face 26. The second and third electrical contacts 24, 25 extend outwards from the planar face 26, substantially in the same direction as the projection. The second and third electrical contacts 24, 25 are spaced radially outwardly from the projection 27 in opposite directions, such that the second and third electrical contacts 24, 25 are arranged substantially in a line. The second electrical contact 24 is spaced from the sidewall of the projection 27 by a distance of about 1.3 mm measured from the central axis of the contact. The third electrical contact 25 is spaced from the sidewall of the projection 27 by a distance greater than the spacing of the second electrical contact 24 from the sidewall of the projection 27. The third electrical contact 25 is spaced from the sidewall of the projection 27 by a distance of about 3.3 mm measured from the central axis of the contact.

In this embodiment, the leaf spring contact 23 is formed from SS301 stainless steel, and the pogo pin contacts 24, 25 are formed from brass.

The pogo pin contacts 24, 25 extend about 1 mm above the planar face 26 of second connector part 21 when they are not compressed, and extend about 0.5 mm above the planar face 26 when they are fully compressed.

The first connector part 1 and the second connector part 21 may be electrically engaged by inserting the distal end of the aerosol-generating device into the cavity of the charging unit. The aerosol-generating device is substantially circularly cylindrical and the cavity of the charging unit is also substantially circularly cylindrical, having a diameter that is larger than the diameter of the aerosol-generating device. Inserting the distal end of the aerosol-generating device into the cavity substantially aligns the face 6 of the first connector part 1 and the face 26 of the second connector part 21. Aligning the faces 6 and 26 also aligns the first electrical contacts 3, 23 of the first and second connector parts 1, 21, aligns the second electrical contacts 4, 24 of the first and second connector parts 1, 21 and aligns the third electrical contacts 5, 25 of the first and second connector parts 1, 21. Accordingly, when the first connector part 1 is brought into contact with the second connector part 21, the first electrical contacts 3, 23 are brought into contact and electrically engaged, the second electrical contacts 4, 24 are brought into contact and electrically engaged and the third electrical contacts 5, 25 are brought into contact and electrically engaged. The distal end of the aerosol-generating device may be inserted into the cavity of the charging unit at any angular position and the aerosol-generating device may be freely rotated in the cavity without affecting the electrical engagement of the first and second connector parts.

Advantageously, the first and second connector parts 1, 21 provide a robust means of electrical connection, that is able to be connected and disconnected a large number of times without damaging the electrical contacts of either connector part. In particular, this is because no electrical contact is provided on the end face of the projection 27 of the second connector part 21. The projection 27 of the second connector part 21 is the feature of the connector parts that extends furthest away from the faces 6, 26 of the connector parts, and as such, the end face of the projection 27 is the most likely feature on either connector part 1, 21 to first come into contact with the opposite connector part during electrical connection of the first and second parts 1, 21. As such, the end face of the projection 27 of the second connector part 21 is the most likely feature of either connector part to be damaged during normal use. Undesired contact between the end face of the projection 27 of the second connector part 21 and the first connector part 1 may occur during connection of the connector parts 1, 21 due to misalignment of the first and second connector parts 1, 21. Such undesired contact may lead to damage of the end face of the projection 27. By not positioning an electrical contact at the end face of the projection 27 of the second connector part 21, the second connector part 21 is made more resilient to damage during normal use.

The aerosol-generating device comprises a rechargeable electrical power supply (not shown) and the charging unit comprises a rechargeable electrical power supply (not shown). The first electrical contacts 3, 23 are configured to transmit data between the aerosol-generating device and the charging unit. The second electrical contacts 4, 24 are configured to transfer power from the rechargeable electrical power supply of the charging unit to the rechargeable electrical power supply of the aerosol-generating device. The third electrical contacts 5. 25 are configured as ground connections.

It will be appreciated that the second connector part may be provided with any suitable number of first, second, and third electrical contacts. For example, the second connector part may be provided with three second electrical contacts and two third electrical contacts. It will also be appreciated that additional electrical contacts may be provided on both the first and second connector parts. For example, an insertion detection electrical contact may be provided on the second connector part for determining when an aerosol-generating device is received in the cavity of the charging unit and electrically connected to the charging unit via the second electrical connector part.

The first and second connector parts 1, 21 comprise a magnetic retention device. The magnetic retention device comprises a first magnetic material in the form of the third electrical contact 5 of the first connector part 1, which comprises a ring or band of a ferromagnetic metal.

The magnetic retention device further comprises a second magnetic material comprising a pair of arcuate bodies 33, 35 of a ferromagnetic material arranged at opposite sides of the electrical contacts 23, 24, 25 of the second connector part 21. The second magnetic material is electrically isolated from the electrical contacts of the second connector part 21.

In this embodiment, the third electrical contact 5 of the first connector part 1 (i.e. the first magnetic material) is formed from a ferromagnetic stainless steel, such as SS430 stainless steel, and the second magnetic material is formed of an alloy of neodymium, iron and boron that is magnetised to form a permanent magnet.

When the first connector part 1 is moved into the proximity of the first connector part 21, the magnetic attraction between the first and second magnetic materials draws the first and second connector parts together, compressing the pogo pin contacts 24, 25 of the second connector part 21, and brining the electrical contacts of each connector part into electrical engagement. The magnetic retention device helps to retain the first and second connector parts in electrical engagement.

It will be appreciated that in other embodiments, the first magnetic material and second magnetic materials may be formed from alternative materials and may be arranged in different positions. For example, the first magnetic material may be arranged behind the electrical contacts of the first connector part 1, forming a ring of a ferromagnetic material that circumscribes the recess 7, beneath the third electrical contact 5.

It will also be appreciated that in other embodiments, the first magnetic material may comprise a magnetised material and the second magnetic material may comprise an unmagnetised magnetic material. In other embodiments, both the first and second magnetic materials may comprise magnetised magnetic materials.

FIG. 5 shows the first and second connector parts 1, 21 in position in an aerosol-generating system 100 according to an embodiment of the disclosure.

The aerosol-generating system 100 comprises an aerosol-generating device 101 having the first connector part 1 arranged at a distal end face. The aerosol-generating system 100 further comprises a charging unit 103 comprising a cavity 104 for receiving the distal end of the aerosol-generating device 101. The cavity 104 comprises the second connector part 21 at a closed end face. The charging unit 103 further comprises a battery 105 and electrical circuitry 106 housed in a housing. The housing defines the circularly cylindrical cavity 104. The first connector part 1 and the second connector part 21 may be brought into electrical engagement by inserting the distal end of the aerosol-generating device 101 into the cavity 104 of the charging unit 103. The aerosol-generating device 101 is circularly cylindrical and the cavity 104 of the charging unit 103 is also circularly cylindrical, having a diameter that is larger than the diameter of the aerosol-generating device 101. Inserting the distal end of the aerosol-generating device 101 into the cavity 104 substantially aligns the face 6 of the first connector part 1 with the face 26 of the second connector part 21. Aligning the faces 6 and 26 of the first and second connector parts 1, 21 also aligns the recess 7 and the projection 27, the first electrical contacts 3, 23, the second electrical contacts 4, 24 and the third electrical contacts 5, 25 of the first and second connector parts 1, 21, respectively. Accordingly, when the first connector part 1 is brought into contact with the second connector part 21, the projection 27 is received in the recess 7, the first electrical contacts 3, 23 are electrically engaged, the second electrical contacts 4, 24 are electrically engaged and the third electrical contacts 5, 25 are electrically engaged.

In one example, as shown in FIG. 5, the cavity 104 of the charging unit 103 is formed by at least one sidewall which extends in a longitudinal direction. The sidewall may have one closed end and one open end such that the aerosol generating device can be inserted into the cavity 104 by moving the aerosol generating device in the longitudinal direction. The first or the second connector part may be arranged at the closed end. In FIG. 5, the second connector part 21 is arranged at the closed end. The cavity 104 may be tubular. In particular, the cavity 104 may have a circular cross-section, a square cross-section, or any other shaped cross-section. Preferably, the cavity has a cross-section that is complementary to the cross-section of the aerosol-generating device.

Figure 6:
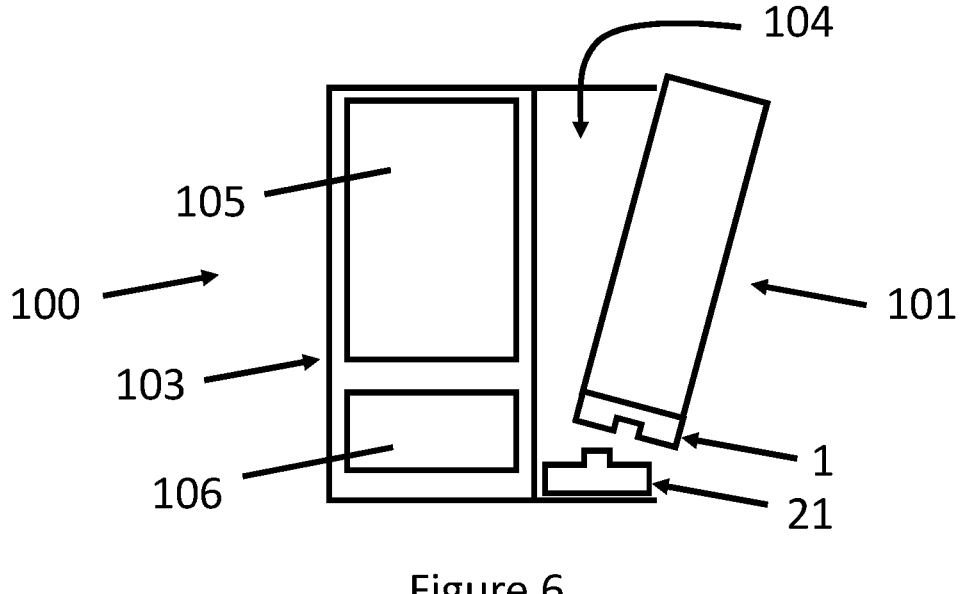
FIG. 6 shows a schematic illustration of an electrically operated aerosol-generating system comprising an electrical connector according to an embodiment of the disclosure, the system comprising an aerosol-generating device being received laterally in a charging unit.
Figure 7:
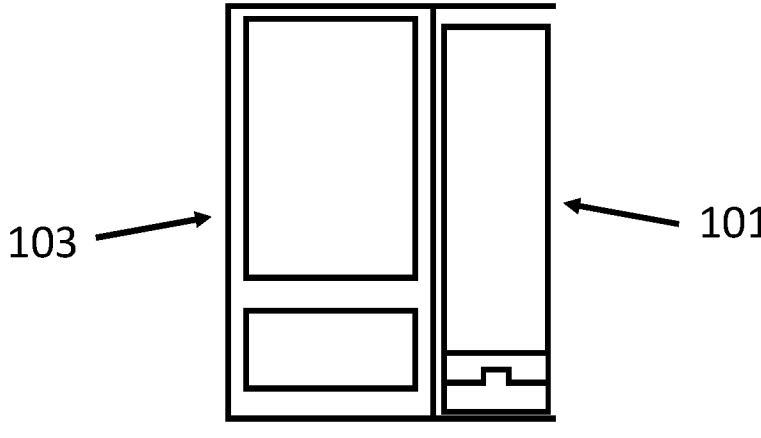
FIG. 7 shows a schematic illustration of the electrically operated aerosol-generating system of FIG. 6, wherein the aerosol-generating device is received in the charging unit and the first and second connector parts of the electrical connector are electrically engaged.

In another example, as shown in FIGS. 6 and 7, the cavity 104 of the charging unit 103 is formed by two closed ends spaced apart in the longitudinal direction. Here there is one sidewall that defines the base of the cavity 104. Thus, the sidewall and the closed ends define a trough into which the aerosol-generating device 101 can be seated. One side of the cavity 104 is open so that the aerosol generating device 101 can be placed in the cavity by moving the aerosol generating device 101 sideways or laterally into the cavity 104. There may be a lid (not shown), such as a flexible flap, provided on the charging unit 103 so that the one open side of the cavity 104 can be covered, thus holding the aerosol generating device 101 in place in the cavity 104. In some embodiments, the system 100 may be provided with additional or alternative retaining devices for retaining the aerosol-generating device 101 in the cavity 104 of the charging unit 103, such as a magnetic retaining device as described below, with references to FIGS. 11 and 12.

It will be appreciated that in the first example of the cavity 104 of the charging unit 103, as shown in FIG. 5, the aerosol-generating device 101 is mounted longitudinally into the cavity 104, whereas in the second example of the cavity 104, as shown in FIGS. 6 and 7, the aerosol-generating device 101 is mounted at least partially sideways or laterally into the cavity 104. The connector described herein is particularly suited for sideways mounting because the contacts are protected from sideways collisions. Sideways or lateral mounting can be done by moving the aerosol generating device 101 into the charging unit 103 at an angle, as shown in FIG. 6, so that the connector part 1 of the aerosol-generating device enters the cavity 104 first, and the protrusion of the second connector part 1 enters the recess of the first connector part 21. Then, the aerosol generating device 101 can be pushed into cavity 104 by rotating it towards the charging unit such that the opposite end of the device to the connector part 1 enters the cavity 104, and the first and second connector parts 1, 21 are electrically engaged.

Figure 8:
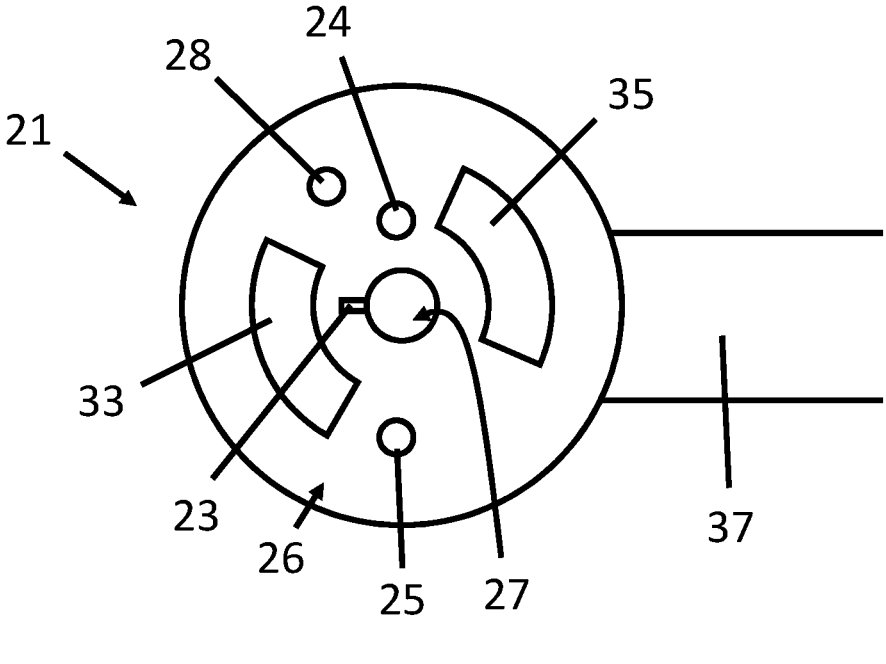
FIG. 8 shows a schematic illustration of a second connector part of an electrical connector according to an embodiment of the disclosure, the second connector part being electrically connectable to the first connector part of FIG. 1.
Figure 9:
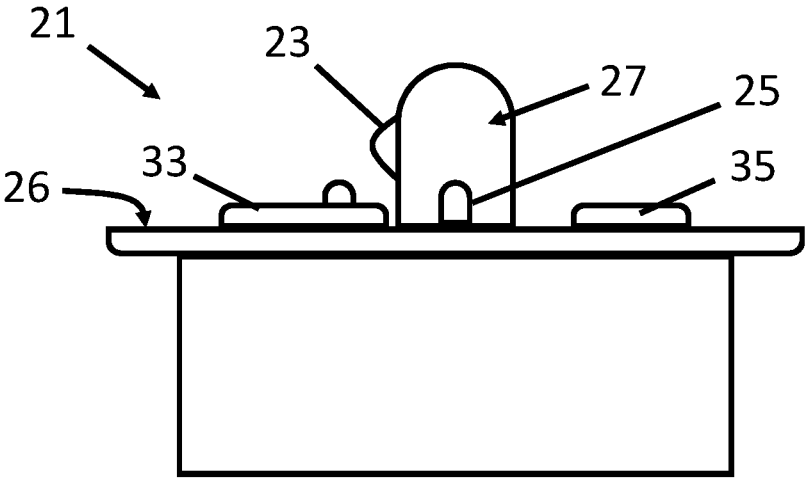
FIG. 9 shows a side view of the second connector part of FIG. 8.

FIGS. 8 and 9 show schematic illustrations of a second connector part 21 of the electrically operated aerosol-generating system according to another embodiment of the disclosure. The second connector part 21 is electrically connectable to the first connector part 21 of FIGS. 1 and 2. The second connector part 21 is arranged at a closed end face of a cavity of a charging unit (not shown). The second connector part 21 comprises four electrical contacts, a first electrical contact 23, a second electrical contact 24, a third electrical contacts 25, and a fourth electrical contact 28.

The second connector part 21 comprises a substantially circular planar face 26, which is substantially the same size as the face 6 of the first connector part 1. The second connector part 21 comprises a projection 27 located at the centre of the circular planar face 26. The projection 27 extends outwards from the face 26 in a direction substantially perpendicular to the plane of the face 26. The projection 27 is substantially circularly cylindrical and comprises an end face and a tubular sidewall extending between the face 26 and the open end face of the projection 27. The end face of the projection 27 is substantially circular and lies on a plane substantially parallel to the plane of the face 26. The projection 27 has substantially the same shape as the recess 7 of the first connector part 1, with a height of about 3 mm and a maximum diameter of about 3.3 mm. The maximum diameter of the projection 27 is slightly smaller than the diameter of the recess 7, such that the projection 27 of the second connector part 21 may fit closely within the recess 7 of the first connector part 1. The diameter or width of the projection 27 reduces towards the end face of the projection 27, such that the interface between the end face and the sidewall of the projection 27 is rounded to make it easier to locate the projection 27 within the recess 7 of the first connector part 1.

The first electrical contact 23 is arranged on the projection 27. The first electrical contact 23 is a leaf spring arranged at the sidewall of the projection 27. The first electrical contact 23 extends radially outwards from the sidewall of the projection 27, in a direction substantially perpendicular to the sidewall, and substantially parallel with the plane 26, by a maximum distance of about 0.3 mm. There is no electrical contact arranged on the end face of the projection 27. The second, third and fourth electrical contacts 24, 25, 28 are resilient pin contacts, or 'pogo pin' contacts, arranged on the planar face 26. The second, third, and fourth electrical contacts 24, 25, 28 extend outwards from the planar face 26, substantially in the same direction as the projection. The second and third electrical contacts 24, 25 are spaced radially outwardly from the projection 27 in opposite directions, such that the second and third electrical contacts 24, 25 are arranged substantially in a line. The second electrical contact 24 is spaced from the sidewall of the projection 27 by a distance of about 1.3 mm measured from the central axis of the contact. The third electrical contact 25 is spaced from the sidewall of the projection 27 by a distance greater than the spacing of the second electrical contact 24 from the sidewall of the projection 27. The third electrical contact 25 is spaced from the sidewall of the projection 27 by a distance of about 3.3 mm measured from the central axis of the contact. The fourth electrical contact 28 is spaced from the sidewall of the projection 27 by the same distance as the third electrical contact 25, by a distance of about 3.3 mm measured from the central axis of the contact. The fourth electrical contact 28 is arranged at the opposite side of the face 26 to the third electrical contact 25, offset from the second electrical contact 24, such that the fourth electrical contact 28 is not in line with the second and third electrical contacts 24, 25.

In this embodiment, the leaf spring contact 23 is formed from SS301 stainless steel, and the pogo pin contacts 24, 25, 28 are formed from brass.

The pogo pin contacts 24, 25, 28 extend about 1 mm above the planar face 26 of second connector part 21 when they are not compressed, and extend about 0.5 mm above the planar face 26 when they are fully compressed.

The first connector part 1 and the second connector part 21 may be electrically engaged by inserting the distal end of the aerosol-generating device into the cavity of the charging unit. The aerosol-generating device is substantially circularly cylindrical and the cavity of the charging unit is also substantially circularly cylindrical, having a diameter that is larger than the diameter of the aerosol-generating device. Inserting the distal end of the aerosol-generating device into the cavity substantially aligns the face 6 of the first connector part 1 and the face 26 of the second connector part 21. Aligning the faces 6 and 26 also aligns the first electrical contacts 3, 23 of the first and second connector parts 1, 21, aligns the second electrical contacts 4, 24 of the first and second connector parts 1, 21 and aligns the third electrical contacts 5, 25 of the first and second connector parts 1, 21. Accordingly, when the first connector part 1 is brought into contact with the second connector part 21, the first electrical contacts 3, 23 are brought into contact and electrically engaged, the second electrical contacts 4, 24 are brought into contact and electrically engaged and the third electrical contacts 5, 25 are brought into contact and electrically engaged. The distal end of the aerosol-generating device may be inserted into the cavity of the charging unit at any angular position and the aerosol-generating device may be freely rotated in the cavity without affecting the electrical engagement of the first and second connector parts. When the first connector part 1 is brought into contact with the second connector part 21, the fourth electrical contact 28 of the second connector part 21 is brought into contact with the third electrical contact 5 of the first connector part.

A flexible circuit 37 connects the electrical contacts 23, 24, 25, 28 of the second connector part 21 to a controller (not shown) of the charging unit.

Figure 10:
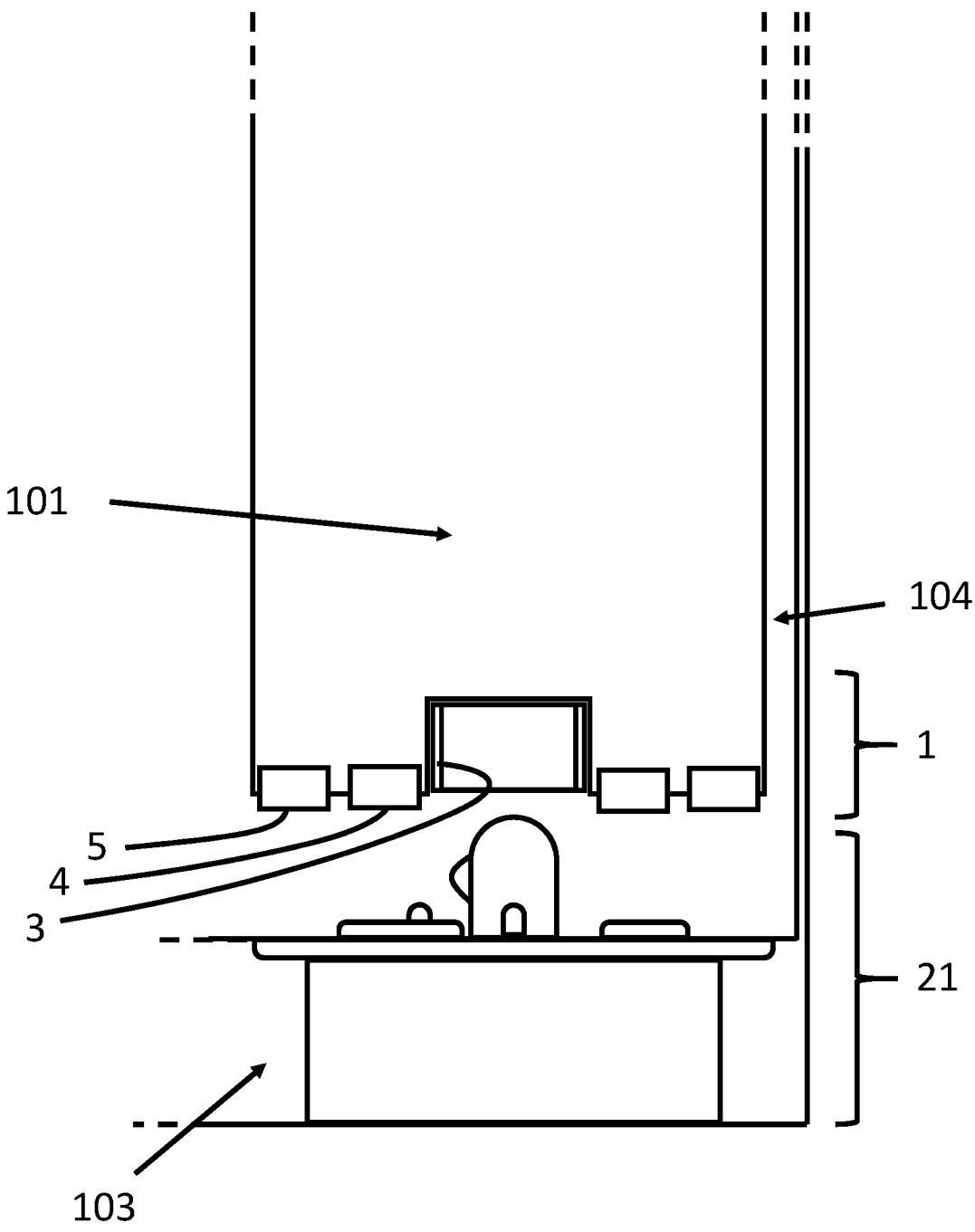
FIG. 10 shows a schematic illustration of an electrically operated aerosol-generating system comprising an electrical connector according to an embodiment of the disclosure, the system comprising an aerosol-generating device received in a charging unit, the aerosol-generating device including the first connector part of FIGS. 1 and 2, and the charging unit comprising the second connector part of FIGS. 8 and 9.

FIG. 10 shows the first connector part 1 of FIGS. 1 and 2, and the second connector part 21 of FIGS. 8 and 9 in position in an aerosol-generating system 100 according to an embodiment of the disclosure.

The aerosol-generating system 100 comprises an aerosol-generating device 101 having the first connector part 1 of FIGS. 1 and 2 arranged at a distal end face. The aerosol-generating system 100 further comprises a charging unit 103 comprising a cavity 104 for receiving the distal end of the aerosol-generating device 101. The cavity 104 comprises the second connector part 21 of FIGS. 8 and 9 at a closed end face. The charging unit 103 further comprises a battery and electrical circuitry housed in a housing. The housing defines the circularly cylindrical cavity 104. The flexible circuit 37 of the second connector part 21 connects the electrical contacts 23, 24, 25, 28 of the second connector part 21 to a controller of the charging unit 103.

The first connector part 1 and the second connector part 21 may be brought into electrical engagement by inserting the distal end of the aerosol-generating device 101 into the cavity 104 of the charging unit 103. The aerosol-generating device 101 is circularly cylindrical and the cavity 104 of the charging unit 103 is also circularly cylindrical, having a diameter that is larger than the diameter of the aerosol-generating device 101. Inserting the distal end of the aerosol-generating device 101 into the cavity 104 substantially aligns the face 6 of the first connector part 1 with the face 26 of the second connector part 21. Aligning the faces 6 and 26 of the first and second connector parts 1, 21 also aligns the recess 7 and the projection 27, the first electrical contacts 3, 23, the second electrical contacts 4, 24 and the third electrical contacts 5, 25 of the first and second connector parts 1, 21, respectively. Accordingly, when the first connector part 1 is brought into contact with the second connector part 21, the projection 27 is received in the recess 7, the first electrical contacts 3, 23 are electrically engaged, the second electrical contacts 4, 24 are electrically engaged and the third electrical contacts 5, 25 are electrically engaged.

In this embodiment, the first electrical contacts 3, 23 are configured for the transfer of data between the charging unit 103 and the aerosol-generating device 101. The second electrical contacts 4, 24 are configured for the transfer of power between the charging unit 103 and the aerosol-generating device 101. The third electrical contacts 5, 25 are configured as ground connections. The fourth electrical contact 28 of the second connector part 21 is configured as an insertion detection pin to detect when the first connector part 1 is electrically connected to the second connector part 21. The fourth electrical contact 28 is in communication with a dome switch (not shown), which closes when the pogo pin contact 28 is compressed. The dome switch is connected to the controller of the charging unit, which is configured to determine that the first connector part 1 is electrically connected to the second connector part 21 when the dome switch is closed.

A magnetic retention device releasably retains electrical engagement between the first and second connector parts 1, 21 of the aerosol-generating system of FIG. 10 when an aerosol-generating device 101 of the system is received in a cavity 104 of a charging unit 103 of the system. The magnetic retention device comprises a first magnetic element at the distal end of the aerosol-generating device 101 and a second magnetic element 32 at a closed end of the cavity 104 of the charging unit.

The first magnetic element at the distal end of the aerosol-generating device is the third electrical contact 5 of the first connector part 1, which comprises a ring of ferromagnetic material.

Figure 11:
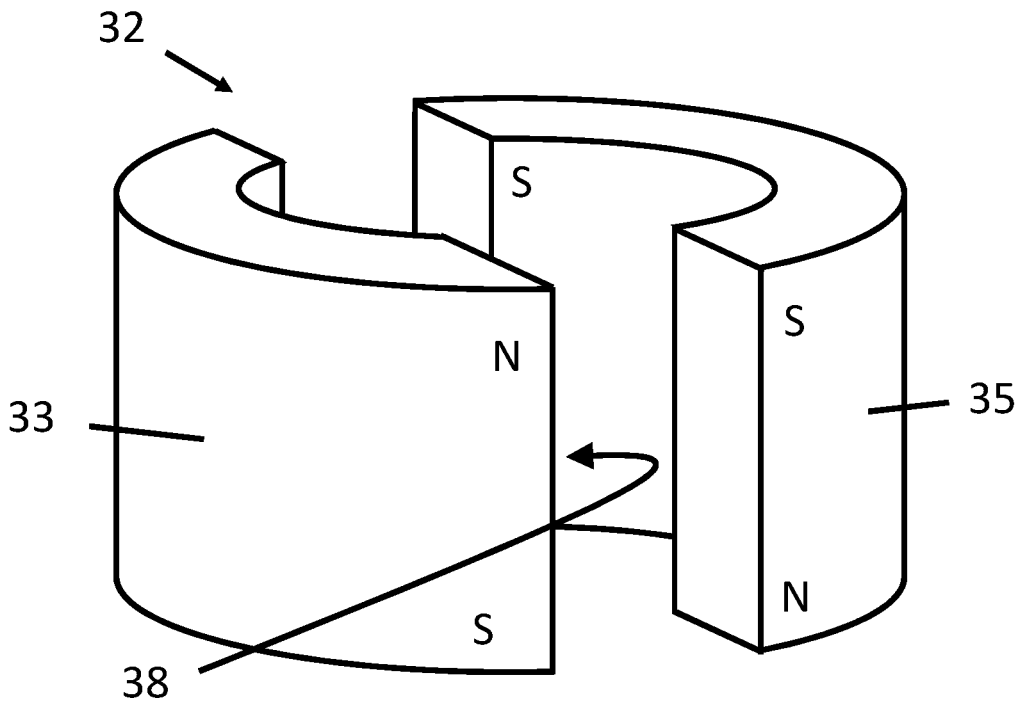
FIG. 11 shows a perspective view of the magnetic retention structure of the second connector part of FIGS. 8 and 9.
Figure 12:
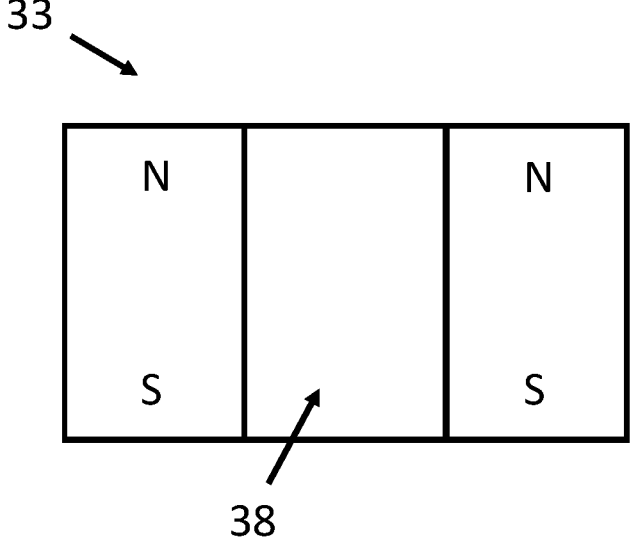
FIG. 12 shows a front view of one of the magnets of the magnetic retention structure of FIG. 11.

The second magnetic element 32 comprises two arcuate permanent magnets 33, 35, as shown in detail in FIGS. 11 and 12. The two permanent magnets 33, 35 are arcuate and have the same curvature as the third electrical contact 3 of the first connector part 1. The permanent magnets 33 and 35 are arranged on opposite sides of the second connector part 21 and are electrically isolated from the second connector part 21. The permanent magnets 33, 35 are arranged about a cylindrical passage 38, and generally circumscribe the cylindrical passage 38, on opposite sides. The cylindrical passage 38 circumscribes the projection 27 of the second connector part 21.

As shown in FIGS. 9 and 10, the permanent magnets 33, 35 extend above the face 26 of the second connector part 21. An arcuate upper surface of the permanent magnets 33, 35 is arranged to a position just below the top of the second, third and fourth pogo pin contacts 24,25, 28, when the pogo pin contacts are in their compressed position. In this arrangement, the third electrical contact 5 of the first connector part 1, which is the first magnetic element of the magnetic retention device, is arranged adjacent to the second magnetic element 32, which comprises the permanent magnets 33, 35 of the second connector part 21, when the device 101 is arranged in the cavity 104, and the first connector part 1 is in contact with the second connector part 21.

Each permanent magnet 33, 35 has a single magnetic north pole at either an upper side or a lower side, and a single magnetic south pole at the opposite one of the upper and lower sides. As shown in FIG. 12 for permanent magnet 33, when each magnet is viewed from the front, looking at the opposing end faces of the arcuate magnet, both end faces of the magnet have a magnetic north-south polarity oriented in the same direction.

The magnetic north-south polarities of the permanent magnets 33, 35 are oriented in opposite directions, as illustrated in FIG. 12 by the letters 'N' and 'S'. The magnetic north pole of the magnet 33 and the magnetic south pole of the magnet 35 are arranged to extend out from the surface of the second connector part 21, in the direction of the central passage 38 through the magnets. In this arrangement, the magnetic north pole of the magnet 33 and the magnetic south pole of the magnet 35 are arranged adjacent to the third electrical contact 5 of the first connector part 1 when the device 101 is arranged in the cavity 104, and the first and second connector parts 1, 21 are engaged. In this arrangement, the permanent magnet 33, the third electrical contact 5 of the first connector part 1, and the permanent magnet 35 form a magnetic circuit.

The magnetic attraction between the first magnetic element and the second magnetic element 32 draws the aerosol-generating device along the longitudinal axis of the cavity 104 towards the second connector part 21 and the second magnetic element 32 at the closed end of the cavity 104. This action facilitates electrical connection of the first and second connector parts 1, 21, as previously described.

Figure 13:
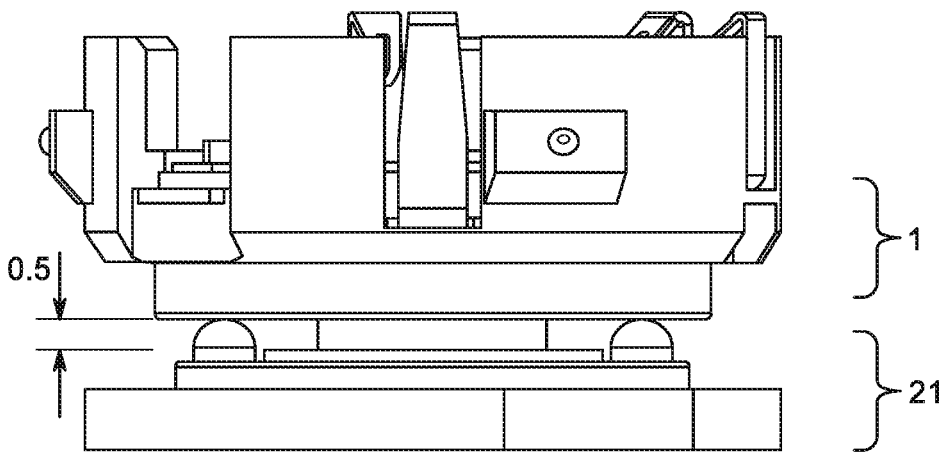
FIG. 13 shows a side view of the electrical connector of the embodiment of FIG. 10 in a first connection position.

FIG. 13 shows the first connector part 1 and the second connector part 21 in a first connection position. In the first connection position, the first and second connector parts 1, 21 are in electrical engagement. In other words, in the first connection position the first electrical contacts of the connector part are engaged, the second electrical contacts of the connector parts are engaged and the third electrical contacts of the connector parts are engaged. In the first connection position, the second, third and fourth electrical contacts of the second connector part, which are all resilient pin contacts, are in their extended position. In the first connection position, the force of the magnetic attraction from between the first magnetic element and the second magnetic element 32 is greater than the force required to depress the second, third and fourth resilient pin contacts of the second connector part, and the force of friction between the device and the charging unit. As such, the first and second connector parts 1, 21 are drawn together by the force of magnetic attraction. A user moving the device into the cavity of the charging unit, through the first connection position, would not experience additional resistance at the first connection position, when the first connector part abuts the resilient pin contacts, as the force of magnetic attraction between the first and second magnetic elements effectively masks the biasing force exerted on the device by the resilient pin contacts. In this embodiment, the first magnetic element and the second magnetic element are separated by about 0.5 millimetres when the first and second connector parts 1, 21 are in the first connection position.

Figure 14:
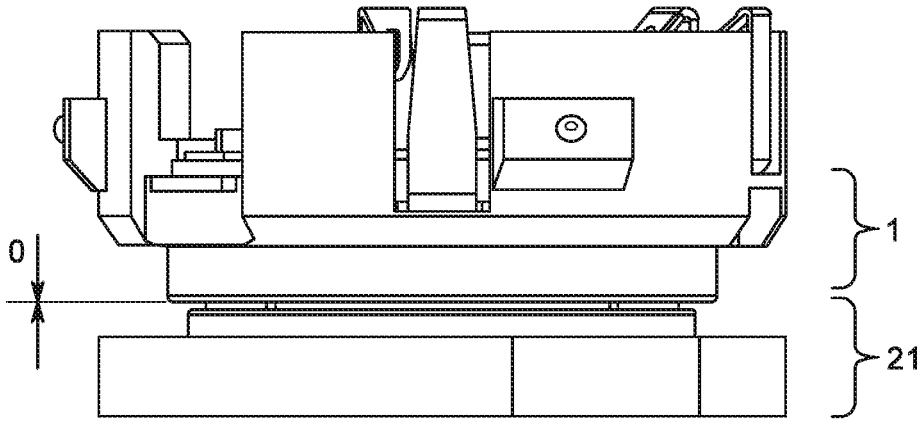
FIG. 14 shows a side view of the electrical connector of the embodiment of FIG. 10 in a second connection position.

FIG. 14 shows the first connector part 1 and the second connector part 21 in a second connection position. In the second connection position, the first and second connector parts 1, 21 are also in electrical engagement. In the second connection position, the second, third and fourth resilient pin contacts are in their depressed position. In the second connection position, the force of the magnetic attraction between the first magnetic element and the second magnetic element 32 is greater than the combination of the biasing force exerted on the first connector part 1 by the resilient pin contacts of the second connector part 21, and the weight of the aerosol-generating device, such that the charging unit and device may be turned upside down and the aerosol-generating device would be held in the second connection position by the force of magnetic attraction. In this embodiment, a small gap is provided between the first and second magnetic elements in the second connection position. It will be appreciated that in other embodiments, the first and second magnetic elements may be in direct contact in the second connection position.

It will be appreciated that features described in relation to one embodiment of the disclosure may be applied to other embodiments of the disclosure. For example, features described in relation to embodiments of an aerosol-generating system comprising an aerosol-generating device, a charging unit, and an electrical connector may also be applied to embodiments of an aerosol-generating device, embodiments of a charging unit, and embodiments of an electrical connector.

For the purpose of the present description and of the appended claims, except where otherwise indicated, all numbers expressing amounts, quantities, percentages and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±{5%} of A. Within this context, a number A may be considered to include numerical values that are within general standard error for the measurement of the property that the number A modifies. The number A, in some instances as used in the appended claims, may 5 deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. An electrical connector for an electrically operated aerosol-generating system, the electrical connector comprising:

a first connector part and a second connector part, the first connector part including a first electrical contact, a second electrical contact at least partially circumscribing the first electrical contact, and a third electrical contact at least partially circumscribing the first electrical contact, wherein the second connector part includes a face and a projection arranged substantially centrally in the face, the projection being defined by an end face, and at least one sidewall extending between the face and the end face of the projection, a first electrical contact arranged on the projection at the at least one sidewall of the projection, a second electrical contact arranged at the face, spaced radially outwardly from the first electrical contact, and a third electrical contact arranged at the face, spaced radially outwardly from the first electrical contact and the second electrical contact, wherein no electrical contacts are arranged at the end face of the projection of the second connector part.

2. The electrical connector according to claim 1, wherein:

the first connector part comprises a face and a recess arranged substantially centrally in the face of the first connector part, the projection of the second connector part being receivable in the recess of the first connector part, the first electrical contact of the first connector part is arranged within the recess, the second electrical contact of the first connector part is arranged at the face of the first connector part, the second electrical contact being radially spaced from the recess by a first distance, and the third electrical contact of the first connector part is arranged at the face of the first connector part, the third electrical contact being radially spaced from the recess by a second distance greater than the first distance.

3. The electrical connector according to claim 2, wherein:

the recess of the first connector part is defined by a closed end face, an open end at the face, and at least one side wall extending between the open end and the closed end face.

4. The electrical connector of claim 3, wherein the first electrical contact of the first connector part is arranged at the at least one side wall of the recess.

5. The electrical connector of claim 3, wherein no electrical contacts are arranged at the closed end face of the recess of the first connector part.

6. The electrical connector of claim 2, wherein the second connector part comprises a fourth electrical contact arranged at the face, the fourth electrical contact being radially spaced from the projection by the second distance and angularly spaced from the third electrical contact of the second connector part, and wherein the fourth electrical contact is configured as an insertion detection contact, to detect when the first and the second connector parts are electrically engaged.

* * * * *